(12) United States Patent
Sharp, III et al.

(10) Patent No.: US 11,568,638 B2
(45) Date of Patent: Jan. 31, 2023

(54) IMAGE TARGETING VIA TARGETABLE 3D DATA

(71) Applicant: Raytheon Company, Waltham, MA (US)

(72) Inventors: Wyatt D. Sharp, III, Murphy, TX (US); Kathryn A. Welin, Arlington, VA (US); Jody D. Verret, Rockwall, TX (US); Richard W. Ely, Lewisville, TX (US); Stephen J. Raif, Sachse, TX (US)

(73) Assignee: Raytheon Company, Waltham, MA (US)

( * ) Notice: Subject to any disclaimer, the term of this patent is extended or adjusted under 35 U.S.C. 154(b) by 123 days.

(21) Appl. No.: 17/020,300

(22) Filed: Sep. 14, 2020

(65) Prior Publication Data

US 2021/0097280 A1    Apr. 1, 2021

Related U.S. Application Data

(60) Provisional application No. 62/908,397, filed on Sep. 30, 2019.

(51) Int. Cl.
| | |
|---|---|
| *G06T 7/60* | (2017.01) |
| *G06V 20/10* | (2022.01) |
| *G06T 15/06* | (2011.01) |
| *G06T 7/593* | (2017.01) |
| *G06V 10/75* | (2022.01) |

(52) U.S. Cl.
CPC ............ *G06V 20/176* (2022.01); *G06T 7/593* (2017.01); *G06T 7/60* (2013.01); *G06T 15/06* (2013.01); *G06V 10/751* (2022.01); *G06T 2207/10028* (2013.01); *G06V 20/194* (2022.01)

(58) Field of Classification Search
CPC .... G06V 20/176; G06V 10/751; G06V 10/44; G06V 20/194; G06V 10/50; G06V 20/647; G06T 7/593; G06T 7/60; G06T 15/06; G06T 2207/10028; G06T 15/10; G06T 2200/04; G06T 2207/10032; G06T 2207/30184; G06T 7/74; G06F 16/587
USPC .................................................. 382/154, 100
See application file for complete search history.

(56) References Cited

U.S. PATENT DOCUMENTS

| | | | |
|---|---|---|---|
| 8,855,442 B2 * | 10/2014 | Owechko ................ G06T 7/344 |
| | | | 382/284 |
| 9,269,145 B2 | 2/2016 | Ely et al. | |
| 9,275,267 B2 | 3/2016 | Verret | |

(Continued)

FOREIGN PATENT DOCUMENTS

WO    WO-2021067252 A1    4/2021

OTHER PUBLICATIONS

"International Application Serial No. PCT/US2020/053240, International Search Report dated Dec. 14, 2020", 3 pgs.

(Continued)

*Primary Examiner* — Sheela C Chawan
(74) *Attorney, Agent, or Firm* — Schwegman Lundberg & Woessner, P.A.

(57) ABSTRACT

A method can include identifying a geolocation of an object in an image, the method comprising receiving data indicating a pixel coordinate of the image selected by a user, identifying a data point in a targetable three-dimensional (3D) data set corresponding to the selected pixel coordinate, and providing a 3D location of the identified data point.

16 Claims, 15 Drawing Sheets

(56) References Cited

U.S. PATENT DOCUMENTS

| | | | | |
|---|---|---|---|---|
| 9,471,986 B2* | 10/2016 | Janky | ................... | G06V 10/40 |
| 10,311,633 B2* | 6/2019 | Roimela | ............. | G06F 3/04815 |
| 2011/0110557 A1* | 5/2011 | Clark | ................... | G01C 11/06 |
| | | | | 382/103 |
| 2020/0312008 A1* | 10/2020 | Cowburn | ............. | G06K 9/6257 |

OTHER PUBLICATIONS

"International Application Serial No. PCT/US2020/053240, Written Opinion dated Dec. 14, 2020", 5 pgs.

Chao-Jung, Liu, et al., "3D point cloud segmentation using GIS", Proceedings of the 20th Irish Machine Vision and Image Processing Conference, (Aug. 29, 2018), 41-48.

Krylov, Vladimir, et al., "Object Geolocation Using MRF Based Multi-Sensor Fusion", 25th IEEE International Conference On Image Processing, (Oct. 7, 2018), 2745-2749.

"International Application Serial No. PCT/US2020/053240, International Preliminary Report on Patentability dated Apr. 14, 2022", 7 pgs.

U.S. Appl. No. 17/231,885, filed Apr. 15, 2021, Three-Dimensional-Enabled Targeting of Imagery with Rigorous Error Propagation.

* cited by examiner

US 11,568,638 B2

IMAGE TARGETING VIA TARGETABLE 3D DATA

RELATED APPLICATIONS

This application claims the benefit of priority to U.S. Provisional Patent Application 62/908,397 titled "Image Targeting Via Targetable 3D Data" and filed on Sep. 30, 2019, which is incorporated herein by reference in its entirety.

TECHNICAL FIELD

Embodiments discussed herein regard devices, systems, and methods for identifying a geolocation of an entity or object in an image.

BACKGROUND

Currently, there is no known automated process for deriving a targeting coordinate. The current process for deriving a targeting coordinate includes a human picking conjugate points between a set of images. The conjugate point selection controls a new image to digital point positioning database (DPPDB) stereo imagery. DPPDB is required for all known targeting applications, whether it is used for targeting or as a control for another image.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments generally relate to devices, systems, and methods for improvements to identifying a geocoordinate of a location of an object or entity ("target") in an image. The geocoordinate can be determined using a targetable three-dimensional (3D) point set and a registered two-dimensional (2D) input image. The targetable 3D point set can be generated based on overhead imagery (e.g., from a satellite or manned or unmanned aerial vehicle). The 3D point set can have metadata to accommodate computation of error for any point within the 3D point set. The input image can be registered to the 3D point set. Registering the 2D image to the 3D point set (sometimes called a targetable surface) allows the image to inherit the accuracy of the targeting surface. The error in the 2D-3D registration process can be added to the error intrinsic in the 3D point set. A user can select a pixel in the image, providing image coordinates for a target. An intersection algorithm can provide a 3D geolocation with error estimates of the coordinates associated with the user-selected image coordinates.

A three-dimensional point set can be extracted from imagery. The 3D point set can model the surface of the visible scene including 3D structures, such as portions of buildings (e.g., walls, windows, roofs, etc.), and vegetation (e.g., trees, shrubs, grass, etc.). Other elevation data can be generated of a same geographical area. Elevation data can be from a digital elevation model (DEM) or other 3D point set. A difference between the DEM and other 3D point sets can include the DEM having a regular spacing between points, while other 3D point sets have irregular spacing between points.

Figure 1:
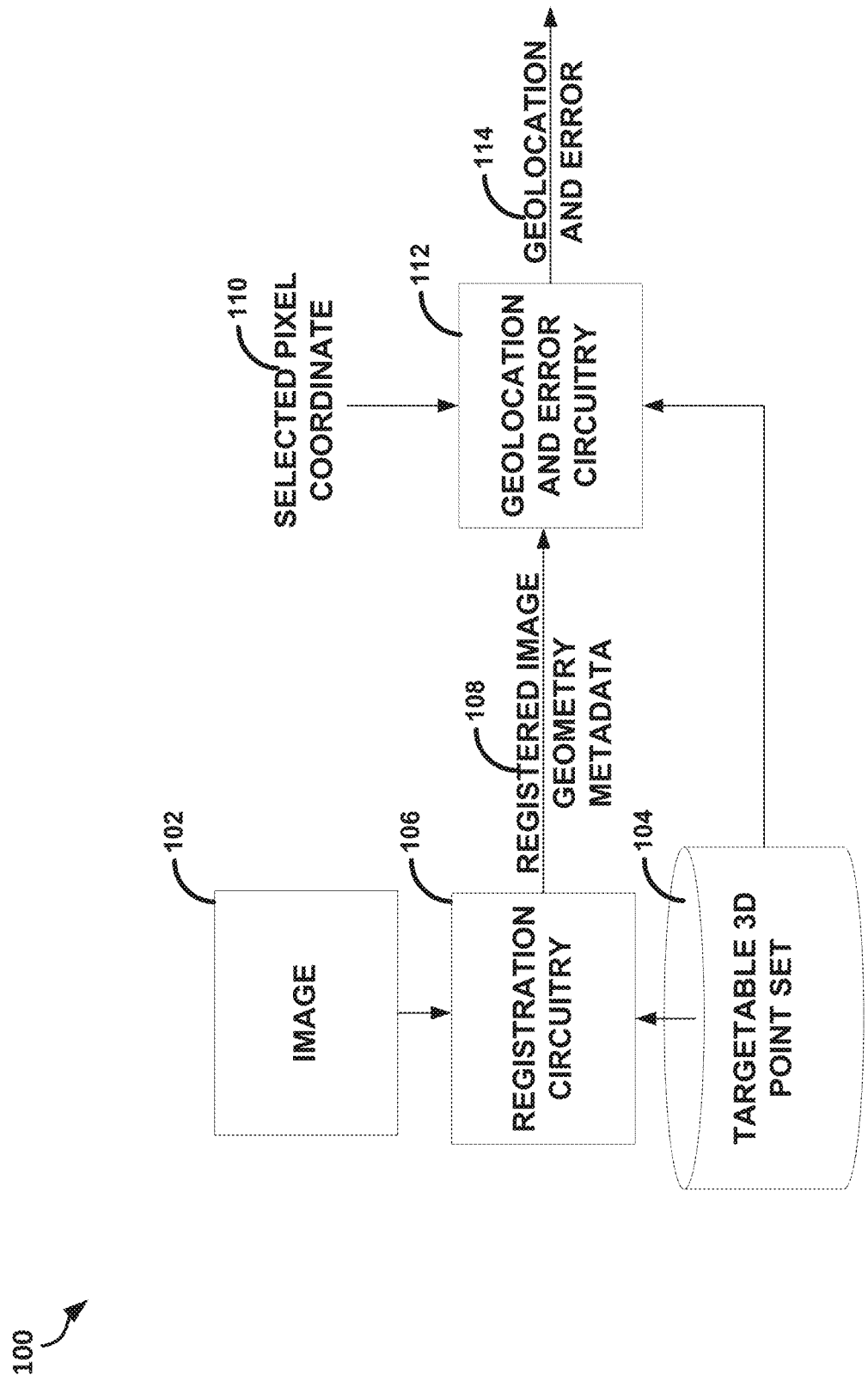
FIG. 1 illustrates, by way of example, a diagram of an embodiment of a system for target geolocation determination and provision with associated error.

FIG. 1 illustrates, by way of example, a diagram of an embodiment of a system 100 for geolocation determination and provision. The system 100 as illustrated includes an image 102 and a targetable 3D point set 104. The image 102 can be of a geographical region that is a subset of a geographical region spanned by the targetable 3D point set 104. The image 102 can be from an image sensor. The image sensor can include a synthetic aperture radar (SAR), electro-optical (EO), multi-spectral imagery (MSI), panchromatic, infrared (IR), nighttime EO, visible, nighttime visible, or other image sensor. The targetable 3D point set 104 can include data indicating latitude, longitude, and elevation of a specific location in space. The targetable 3D point set 104 can include a digital elevation map (DEM) that includes regularly spaced points, a passive, photogrammetrically derived 3D (P3D) point set or other 3D point set that includes irregularly spaced points. In some embodiments, the targetable 3D point set 104 further includes intensity data for each point. The intensity data can be derived from imagery of the geographical region.

The system 100 includes registration circuitry 106 that registers the image 102 to the points in the targetable 3D point set 104. The registration circuitry 106 can alter the geometry of the image 102 to make respective pixels of the image 102 align with respective points of the targetable 3D point set 104 at a same geographic location with a specified error. There are multiple ways to register the image 102 to the targetable 3D point set 104. Some of these are discussed below regarding FIGS. 7-11. The technique used to register the image 102 to the targetable 3D point set 104 can be dependent on the data available with the targetable 3D point set 104, the type of sensor used to generate the image 102, a registration accuracy required, or the like. The targetable 3D point set 104 can represent a physical surface, such as a surface of the Earth. The registered 3D data set can have associated metadata that includes error estimates of absolute geolocation for every point in the 3D data set.

The registration circuitry 106 or other circuitry herein can include electric or electronic components configured to perform operations thereof. Electric or electronic components can include one or more processing units, such as a central processing units (CPUs), application specific integrated circuits (ASICs), field programmable gate array (FPGA), graphics processing unit (GPU), or the like. The electric or electronic components can additionally or alternatively include one or more resistors, transistors, inductors, capacitors, diodes, logic gates (e.g., AND, OR, XOR, negate, buffer, or the like), switches, multiplexers, power supplies, digital to analog converter (DAC), analog to digital converter (ADC), rectifiers, amplifiers, modulators, demodulators, or the like, situated in a circuit to perform the operations thereof. In some embodiments, the operations can be performed by software executing on the circuitry.

The registration circuitry 106 can generate an image that is registered to the targetable 3D point set 104, called a registered image (the image 102 with registered image geometry metadata 108). The registration process performed by the registration circuitry 106 includes a known error, per pixel, that can be recorded.

The system 100 further includes geolocation and error circuitry 112. The geolocation and error circuitry 112 can receive the registered image geometry metadata 108, a subset of the targetable 3D point set 104 corresponding to the geolocation of the image 102 (same or different from the subset used by the registration circuitry 106 to register the image 102 to the targetable 3D point set 104), and an indication of pixel image coordinates 110 within image 102 selected by a user. The image 102 and registered image geometry metadata 108 can be presented to a user on a display (e.g., display unit 1610, see FIG. 16). The user can select pixel image coordinates 110 (e.g., using an input device 1612 see FIG. 16) and the geolocation and error circuitry 112 can return a geolocation and error 114 corresponding to the selected pixel image coordinates 110. The pixel image coordinates 110 can be chosen from the image 102. The registered image geometry metadata 108 includes the pixel data from the image 102 and the corrected image geometry metadata from the registration process. The error of the geolocation and error 114 can indicate the geolocation accuracy of the corresponding geolocation.

Figure 2:
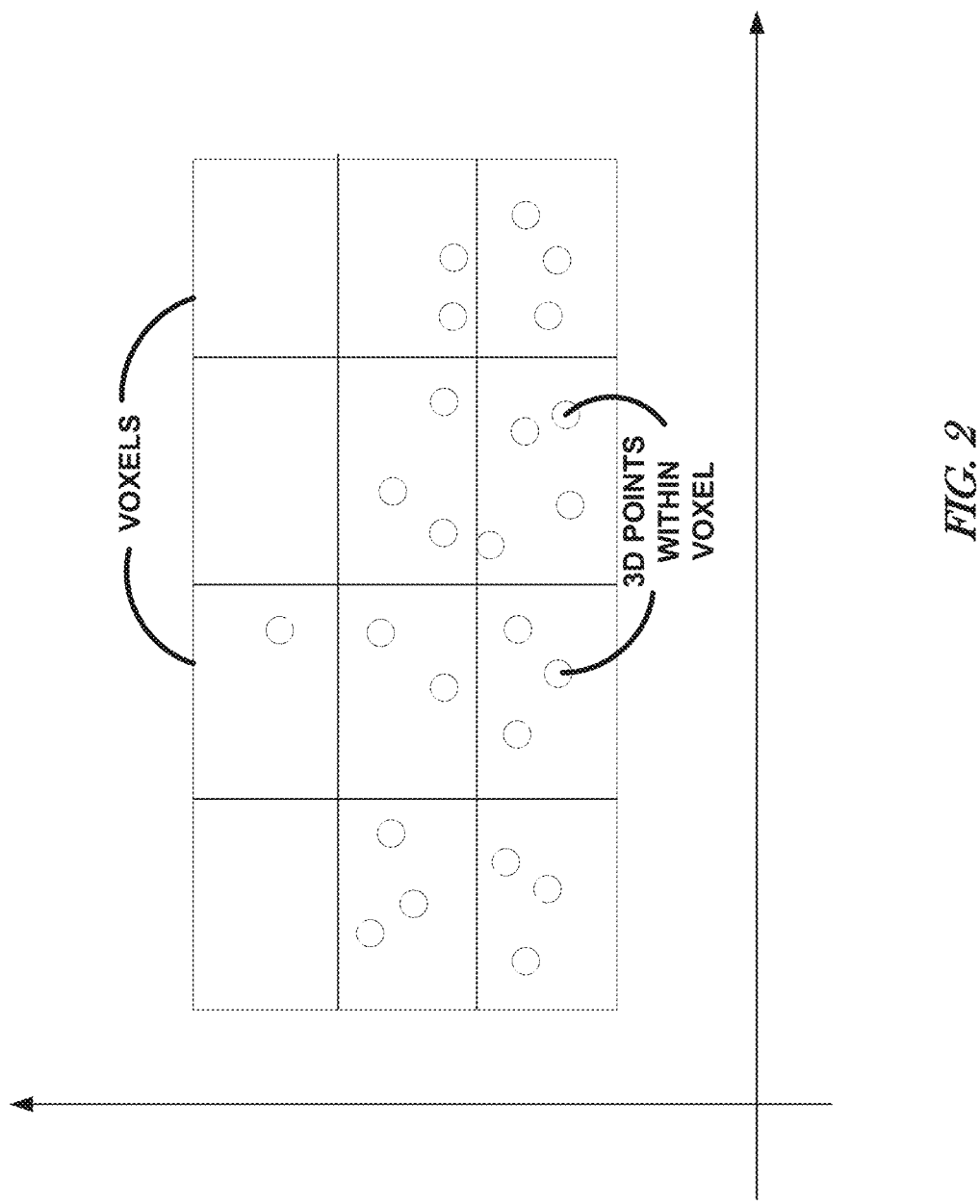
FIGS. 2-4 illustrate, by way of example, respective conceptual block diagrams of an embodiment of a technique for selecting a point in the 3D point set.
Figure 3:
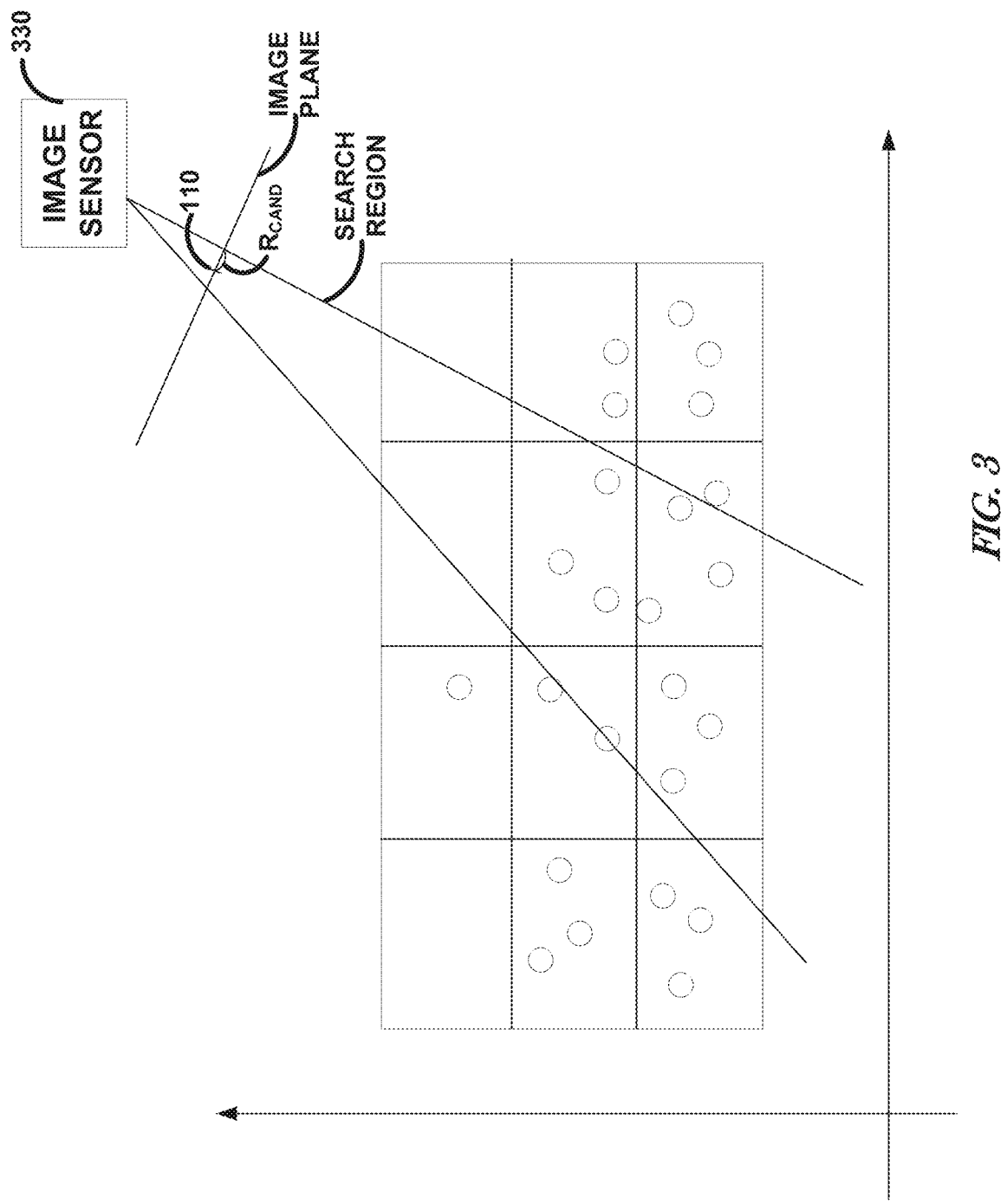
Figure 4:
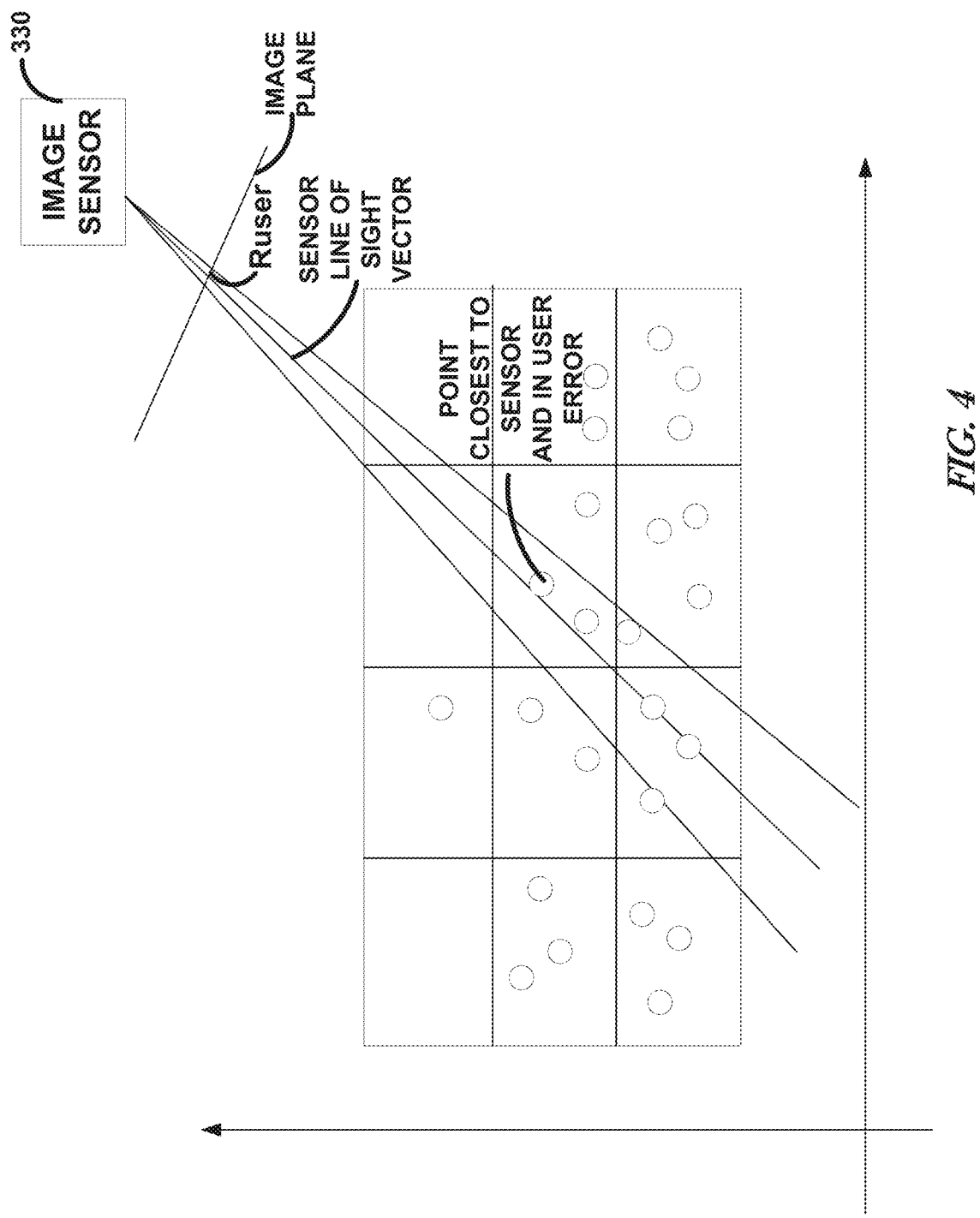

FIGS. 2-4 illustrate, by way of example, respective conceptual block diagrams of an embodiment of a technique for selecting a point in the targetable 3D point set 104 associated with user-selected pixel image coordinates 110. FIG. 2 illustrates how the targetable 3D point set 104 is "voxelized". Voxelizing includes generating a set of point indexes for each voxel. Each voxel represents a 3D space about the Earth's surface. The voxels are arranged in a 3D volume that constitute a notional 3D space. The indexes for a voxel indicates the 3D points in the targetable 3D point set 104 that fall within the space represented by the voxel. In the 2D voxel representation provided in FIG. 2, the lower right voxel would include indexes of three 3D points of the targetable 3D point set 104. Voxelizing the 3D point set can occur in advance or at runtime.

FIG. 3 illustrates how to identify candidate voxels based on a position and orientation (relative to the targetable 3D point set 104) of an image sensor 330. The position and orientation of the image sensor 330 can be determined based on registered image geometry metadata 108. Each of the voxels that is intersected by a search region (e.g., area or volume, such as a cone with a radius, $R_{CAND}$) at an image plane can be identified. $R_{CAND}$ is the distance from the selected pixel coordinate 110 to an edge of the cone in the example of FIG. 3. The search region in the example of FIG. 3 is a cone in 3D associated with the search radius $R_{CAND}$. Note that the illustrated cone of FIG. 3 is merely an example of a search region and search regions of other areas or volumes are within the scope of this application. Examples of other search region areas or volumes include a triangle, rectangle, trapezoid, circle, pyramid, cylinder, parallelogram, a polygon or 3D version thereof, an irregular area or volume, or the like. Each of the intersected voxels can be recorded as potentially including the 3D point corresponding to the geolocation selected by the user. For each of the intersected voxels, the indexes of 3D points in the voxels can be retrieved. In some embodiments, the associated 3D point set data indicated by the indexes can be retrieved.

The sensor position for user-selected image coordinate can be approximated via rational functions provided or defined in registered image geometry metadata 108. The cone of rays extending from the image sensor 330 can be centered on a location corresponding to the user-selected image coordinates after registration. The rays can be intersected with the voxels. Candidate target points are indexes within intersected voxels. The size of $R_{CAND}$ can be determined based on the ground sampling distance of the registered image (as indicated by the registered image geometry metadata 108) and the spacing of the points in the targetable 3D point set 104 so that the true target location lies somewhere in the cone.

FIG. 4 illustrates how to transfer a user-selected image coordinate 110 to the targetable 3D point set 104 based on the candidate voxels and indexes. A narrower cone than the one illustrated in FIG. 3 is generated. The narrower cone can have a restricted radius, $R_{USER}$, at the image plane that is set to the user's ability to mensurate in the image. Discrepancy values can be determined for each 3D point within the narrower cone. A discrepancy value can be determined by projecting each point in the narrower cone to the registered image geometry metadata 108 of the image 102. The discrepancy value can then be determined as a difference between an image coordinate of the selected pixel coordinate 110 in the image 102 and an image coordinate of the projected 3D point from the targetable 3D point set 104. The 3D point selected can be the one within the cone that is closest to the determined image sensor position in space.

Figure 5:
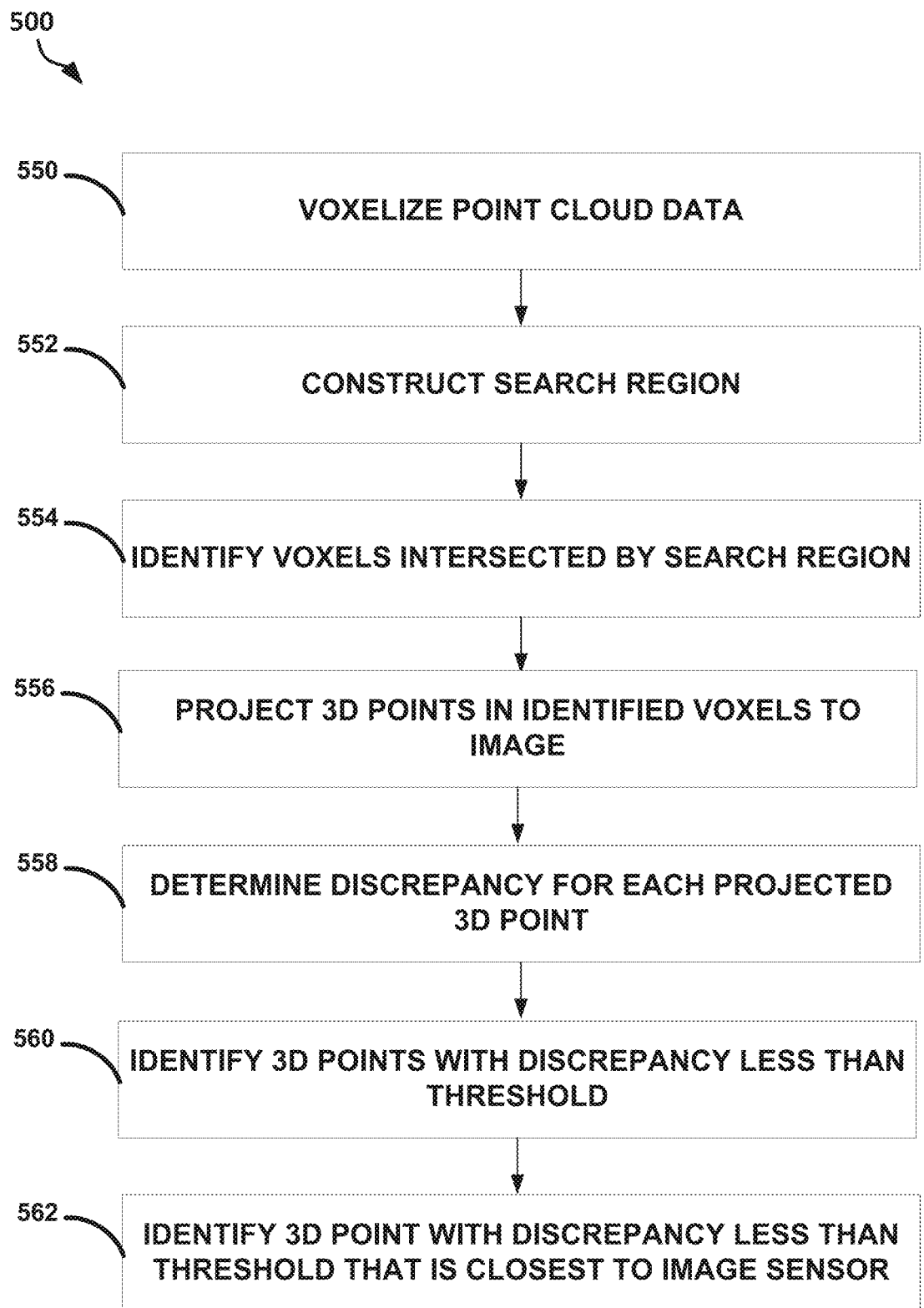
FIG. 5 illustrates, by way of example, a diagram of an embodiment of a method for determining a geolocation of a selected point in a registered image.

FIG. 5 illustrates, by way of example, a diagram of an embodiment of a method 500 for determining a geolocation of a selected point in a registered image. The method 500 as illustrated includes voxelizing point cloud data of a 3D point set, at operation 550; constructing a search region, at operation 552; identifying voxels intersected by the search region, at operation 554; projecting 3D points in identified voxels to image, at operation 556; determining a discrepancy for each projected 3D point, at operation 558; identifying 3D points with a discrepancy less than a threshold $R_{USER}$, at operation 560; and identifying the 3D point with a discrepancy less than the threshold $R_{USER}$ that is closest to the image sensor, at operation 562.

The operation 550 can be performed for just a subset of the image 102. The subset can include the points in the targetable 3D point set 104 that were used to register the image 102. The operation 550 can be performed in advance or at runtime. The operation 552 can include forming a cone, cylinder, rectangle or other shape that is determined to encompass a specified error with a search region. The search region can be formed with the selected pixel coordinate 110 as a center.

The operation 556 can include using rational functions defined in registered image geometry metadata 108 of the image 102 to project the points in voxels identified at operation 554 to the image 102 via the registered image geometry metadata 108. The operation 558 can include determining a difference between a coordinate of the selected pixel coordinate 110 in the image 102 and the coordinates of the image 102 to which the 3D points are projected at operation 556. The threshold $R_{USER}$ of operation 560 can be a defined number of pixels (converted to spatial distance) that includes user error in selecting the pixel coordinate 110. A talented targeteer can often select a pixel to within a half pixel error, while a less-experienced targeteer can select a pixel to within about a pixel or 1.5 pixels. Other thresholds for $R_{USER}$ are possible.

The operation 562 can include determining a geolocation of the 3D point relative to a position of the image sensor 330. The location of the image sensor 330 can be determined using the registered image geometry metadata 108 or can otherwise be known or determined based on available data.

The method 500 can include looking up the latitude, longitude, and height of the point identified at operation 562 based on the index of the voxel of which the point is a member. The latitude, longitude, and height of the point can be returned to the user as the 3D geolocation and error 114 associated with the user-selected pixel coordinate 110.

Determining the error of the geolocation and error 114, by the geolocation and error circuitry 112, can include determining known contributors to the error. Contributions to the error can be from construction and registration of the targetable 3D point set 104 (sometimes called a generic point-cloud model (GPM) error), user image mensuration, registering the image 102 to the targetable 3D point set 104, determining the geolocation based on the selected pixel coordinate 110, and other potential mensuration errors. These error contributors are summarized in Equation 1:

$$C_{TOTAL} = C_{GPM} + C_{USER} + C_{REG} + C_{TRANSFER} + C_{OTHER}$$

Each of the "C" errors in the above equation can represent a general 3×3 error covariance in ground coordinates. The GPM error $C_{GPM}$ is an example of the error associated with the points in the 3D data set (point cloud). The GPM error is derived from the process of forming the targetable 3D point set. The National Geospatial-Intelligence Agency (NGA) defines the GPM standard for representing error in point clouds. Other error representations are possible.

Each of the errors, besides $C_{GPM}$ and $C_{OTHER}$, can be determined in a manner similar to that used to determine the user error, $C_{USER}$. Note that each of the errors (in general) is a 3×3 full error covariance on the ground. The user mensuration error, $C_{USER}$, is a function of how well the user can point the target with the error propagated to the ground.

Figure 6:
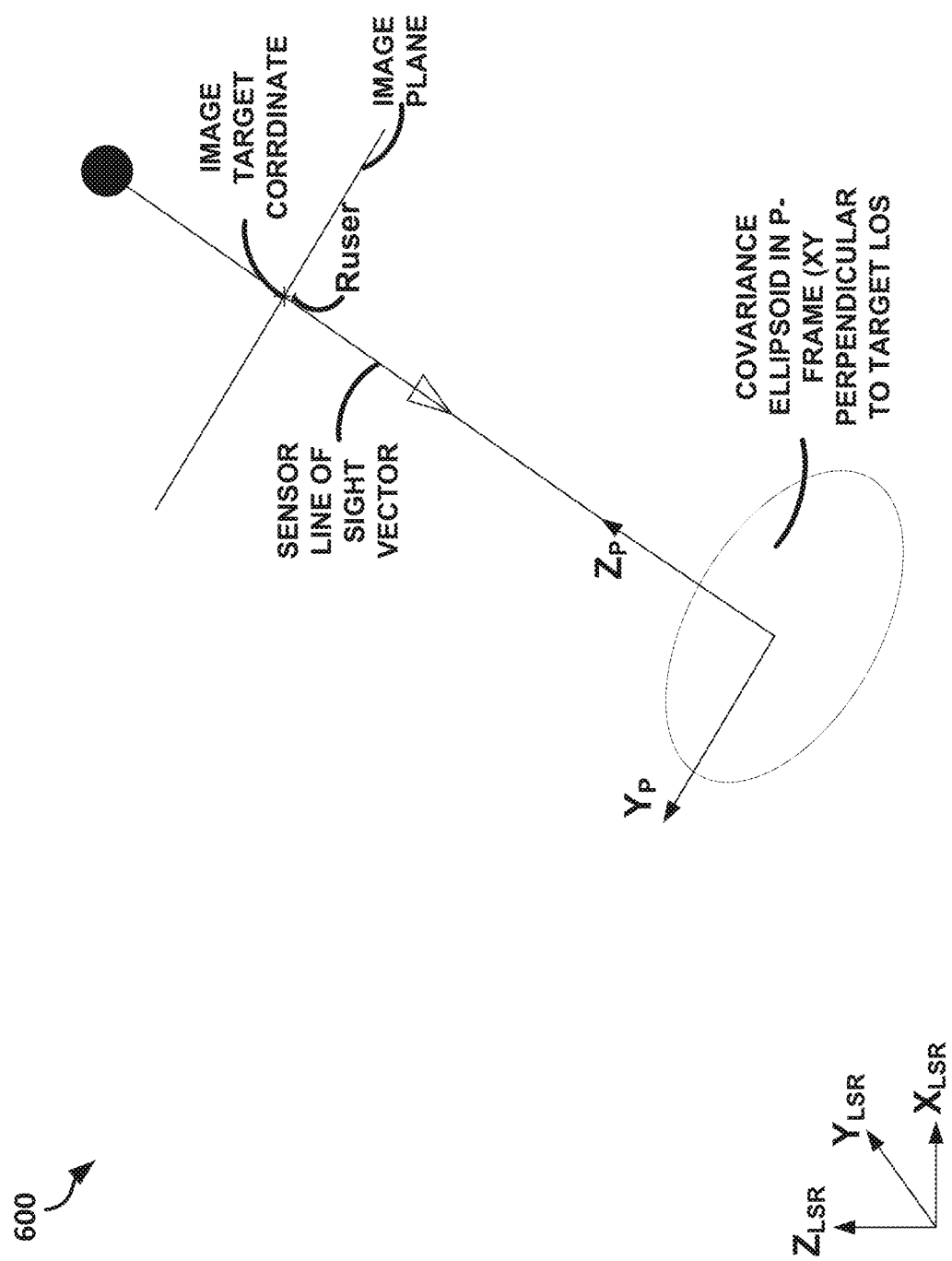
FIG. 6 illustrates, by way of example, a conceptual diagram of how ground error associated with user-selected image coordinates can be determined.

FIG. 6 illustrates, by way of example, a conceptual diagram of how $C_{USER}$ can be determined. A ground coordinate frame (P) perpendicular to the sensor line-of-sight can be constructed. A ground sample distance (GSD) of a pixel in sample ($g_s$) and line ($g_l$) direction in this frame can be determined, such as based on registered image geometry metadata 108. $R_{user}$ can be propagated to the P-frame. A covariance can be constructed in the P-frame as:

$$C_{USER}^{P} \begin{bmatrix} (R_{USER} g_s)^2 & 0 & 0 \\ 0 & (R_{USER} g_l)^2 & 0 \\ 0 & 0 & \sigma_z^2 \end{bmatrix}$$

The P-frame covariance can be propagated to the ground via $$C_{USER} = J_L^G J_P^L C_{USER}^P [J_P^L]^T [J_L^G]^T$$

The symbol $J_P^L = dL/dP$ is the error propagation Jacobians from system P to "Local System Rectangular", or LSR. The LSR frame is one that is constructed tangent to the surface of the earth. The quantity $J_L^G = dG/dL$ is the Jacobian from LSR to "Ground". Ground in this context can be a Universal Transverse Mercator (UTM) map projection space ($UTM_x$, $UTM_y$, height in the p-frame), or LSR space. In the latter case the Jacobian $J_L^G = dG/dL$ is simply the identity.

Regarding $C_{REG}$, registering the image 102 to the targetable 3D point set 104 can employ a photogrammetric resection process discussed below. If a control point CP coordinate error covariance is set correctly, the a posteriori errors of a registration adjustment provides the registration error covariance on the ground, $C_{REG}$. The CP error that influences the registration covariance can be determined similar to $C_{USER}$, with $R_{USER}$ replaced with the one-sigma value for the image correlation process for the image 102 to 3D point set registration.

The a priori covariance from the CPs can thus be formed as $$C_{GCP,REG}^{P} = \begin{bmatrix} (\sigma_{USER} g_s)^2 & 0 & 0 \\ 0 & (\sigma_{USER} g_l)^2 & 0 \\ 0 & 0 & \sigma_z^2 \end{bmatrix}$$

Where $\sigma_{CORR}$ is the one-sigma value for tiepoint correlator accuracy (e.g., conservatively set to 0.5 pixels, but can be less or even set to one pixel or more if the registration process is not very accurate). Identical Jacobians to $C_{USER}$ can be employed to propagate the covariance from a P-frame to a G-frame.

Regarding $C_{TRANSFER}$, a technique for target transfer can generate a discrepancy vector in image space of the image 102. This discrepancy vector can be the discrepancy of the point closest to the image sensor, as determined in 562 of FIG. 5. A P-frame error covariance very similar to $C_{USER}$ can be determined but with $R_{USER}$ replaced with discrepancy vector values in the corresponding directions.

The target transfer error can thus be formed in the P-frame as $$C_{TRANSFER}^{P} \begin{bmatrix} (\delta_s g_s)^2 & 0 & 0 \\ 0 & (\delta_l g_l)^2 & 0 \\ 0 & 0 & \sigma_z^2 \end{bmatrix}$$

Where $\delta_s, \delta_l$ is the discrepancy vector in the sample and line directions of the image space of the transferred 3D target coordinate. Identical Jacobians to $C_{USER}$ can be employed to propagate from a P-frame to a G-frame.

Using $C_{OTHER}$, other system mensuration errors can also be accommodated. For example, if a new building is in the image 102, but not in the targetable 3D point set 104, one might measure the height of the building in the image 102 using a photogrammetric mensuration tool.

The base of a structure (e.g., any object with a corresponding height in the image 102, such as a flag pole, building, vehicle, appliance, statue, bridge, etc.) can be a first user-mensurated image point and a second user-mensurated image point at the top of the structure can be a second user-mensurated image point. The error covariance associated with the height can be an additional error source that is added as $C_{OTHER}$. In some cases, $C_{OTHER}$ is zero, such as in a normal single-point targeting scenario.

Next, photogrammetric resection techniques (sometimes called bundle adjustment) are discussed in more detail. These techniques can be performed by the registration circuitry 106.

As previously discussed, the image 102 can be from an image sensor 330. The image sensor 330 can include a synthetic aperture radar (SAR), electro-optical (EO), multi-spectral imagery (MSI), panchromatic, infrared (IR), night-time EO, visible, nighttime visible, or other image sensor. Applications of accurate registration to a 3D source include cross-sensor fusion, change detection, 3D context generation, geo-positioning improvement, target locating, target identification, or the like. In an example, the registration includes forming a "synthetic image" by projecting the 3D point set to an image space of the image being registered and populating the pixel intensities with the image intensity attribute for each point contained in the point set. An edge-based, two-step registration technique, coarse registration followed by fine registration, may be used to extract a set of tie points (TPs) (that can be converted to control points (CPs)) for a set of image tiles. The CPs, which are derived from the 3D point set and the TPs, can be used in a geometric bundle adjustment to bring the 2D image into alignment with the 3D source.

Figure 7:
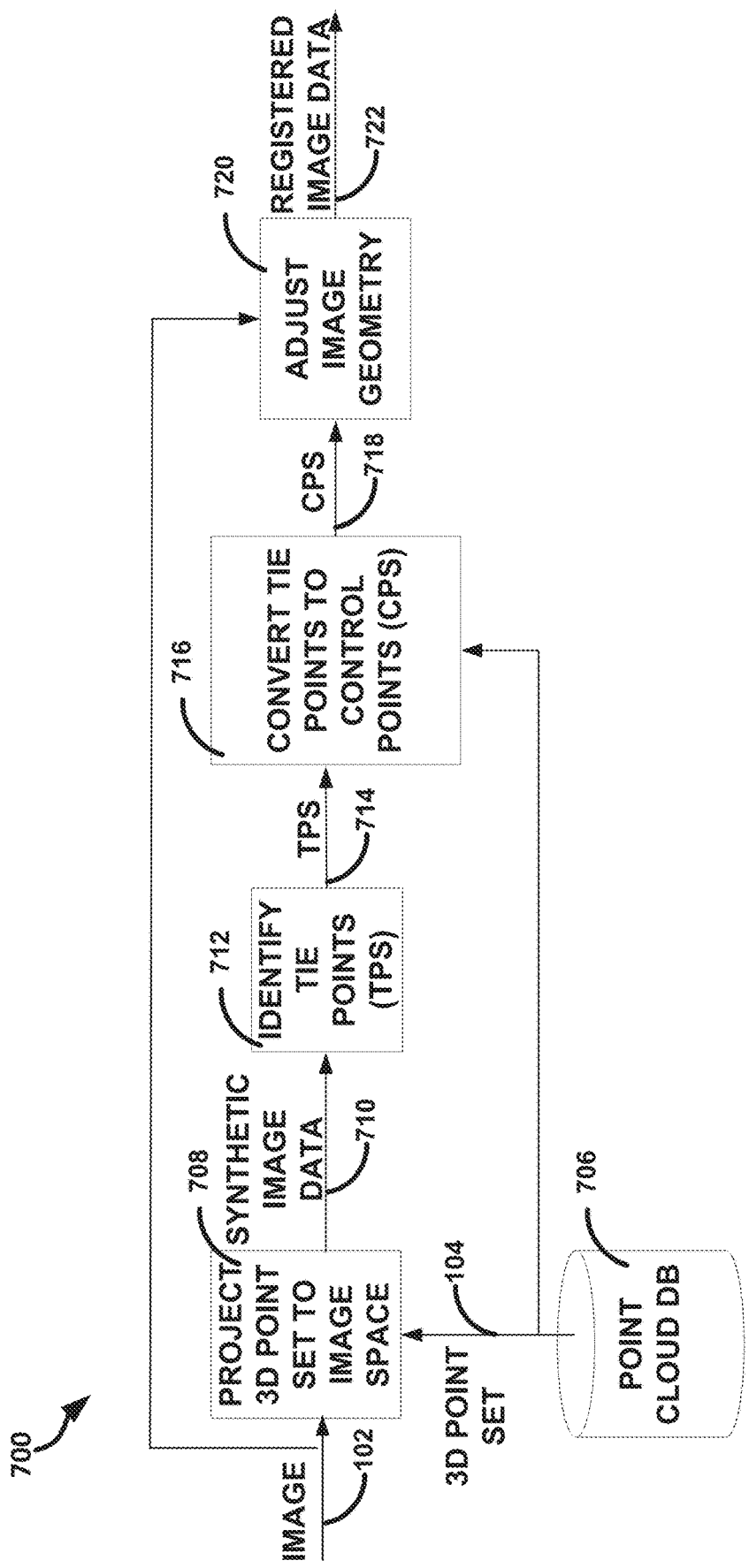
FIG. 7 illustrates, by way of example, a flow diagram of an embodiment of a method for 2D image registration to a 3D point set.

FIG. 7 illustrates, by way of example, a flow diagram of an embodiment of a method 700 for 2D image registration to a 3D point set. The method 700 includes receiving image 102 and the targetable 3D point set 104. The image 102 can be from a SAR, EO, panchromatic, IR, MSI, nighttime EO, visible, nighttime visible, or another image sensor. The image sensor may be satellite based, located on a manned or unmanned aerial vehicle, mounted on a moveable or fixed platform, or otherwise positioned in a suitable manner to capture the image 102 of a region of interest. The targetable 3D point set 104 can be from a point cloud database (DB) 706. The targetable 3D point set 104 can be of a geographical region that overlaps with a geographical region depicted in the image 102. In some embodiments, the targetable 3D point set 104 can be of a geographical region that includes the entire geographical region depicted in the image 102. In some embodiments, the targetable 3D point set 104 can cover a larger geographical region than the geographical region depicted in the image 102.

The image registration can occur in an overlap between the targetable 3D point set 104 and the image 102. The 3D point set data in the overlap (plus an uncertainty region) can be provided as input to operation 708. The overlap can be determined by identifying the minimum (min) and maximum (max) X and Y of the extent of the 3D point set intersected with the min and max X and Y of the image 102, where X and Y are the values on the axes of a geometric coordinate system of the image 102.

The operation 708 can include establishing a scale of the synthetic image data 710 and its geographical extent. The scale can be computed as a point spacing of the targetable 3D point set 104 or as a poorer of the point spacing of the targetable 3D point set 104 and the X and Y scale of the image 102. The geographical extent of the synthetic image data 710 can be determined by generating an X,Y convex hull of the targetable 3D point set 104 and intersecting it with a polygon defined by X,Y coordinates of the extremes of the image 102. The minimum bounding rectangle of this overlap region can define an output space for the synthetic image data 710.

At operation 708, the targetable 3D point set 104 can be projected to an image space of the image 102 to generate synthetic image data 710. The image space of the image 102 can be specified in metadata associated with image data of the image 102. The image space can be the geometry of the image, such as a look angle, focal length, orientation, the parameters of a perspective transform, the parameters and coefficients of a rational polynomial projection (e.g., XYZ-to-image and/or image-to-XYZ), or the like. The operation 708 can include altering a geometry of the image 102 to match the geoposition of the 3D point set 104.

If more than one point from the targetable 3D point set 104 projects to a same pixel of the synthetic image data 710, the point from the 3D point set that is closest to the sensor position can be used. This assures that only points visible in the collection geometry of the image 102 are used in the synthetic image data 710. Points that project outside the computed geographic overlap (plus some uncertainty region) can be discarded.

Each point in the targetable 3D point set 104 can include an X, Y, Z coordinate, elevation, and color value (e.g., a grayscale intensity, red, green, blue intensity, or the like). In some embodiments a median of the intensities of the pixels that the point represents in all the images used to generate the targetable 3D point set 104 can be used as the color value.

A geometry of an image can be determined based on a location, orientation, focal length of the camera, the parameters of a perspective transform, the parameters and coefficients of a rational polynomial projection (e.g., image-to-XYZ or XYZ-to-image projection or the like), and/or other metadata associated with the imaging operation in the image 102.

The initial synthetic image data 710 may have pixels that were not filled (called void pixels). Void pixels are created when no point in the targetable 3D point set 104 projected to that pixel of the synthetic image data 710. To fill in the void pixels, an interpolation method can be used that first looks for opposite neighbors in a neighborhood of the pixel (pixels contiguous with the pixel or less than a specified number of pixels away from the pixel). An average value (e.g., a mean, median, mode, or other average value) of all such pixels can be used for an intensity value for the uninitialized pixel. If no opposite neighbors exist, the intensity can be set to a mean intensity of all neighbors. If the neighborhood contains no initialized pixels, then a mean intensity of an outer ring or other pixels of a larger neighborhood can be used as the intensity value for the pixel. If the larger neighborhood (e.g., a 5×5 with the pixel at the center) is empty, then the pixel intensity can be set to 0 to indicate it is a void pixel. The interpolation process can be run iteratively to fill in additional void pixels. Void pixels may remain after the interpolation process, but the registration process and further applications are designed to handle such voids.

At operation 712, tie points (TPS) 714 can be identified in the synthetic image data 710. A TP is a four-tuple (row from synthetic image data 710, column from synthetic image data 710, row of the image 102, column of the image 102) that indicates a row and column of the image 102 (row, column) that maps to a corresponding row and column of the synthetic image data 710 (row, column).

The operation 712 can include operating an edge-based technique on an image tile to generate an edge pixel template for the synthetic image data 710 to be correlated with the gradient of image 102. An edge pixel template can include a gradient magnitude and phase direction for each edge pixel in an image tile. The edge pixel template can include only high contrast edges (not in or adjacent to a void in the synthetic image data 710). Alternatives to edge-based correlation techniques include fast Fourier transform (FFT), or normalized cross correlation (NCC), among others.

In some embodiments, the operation 712 can include a two-step process, coarse registration followed by fine registration. The coarse registration can operate on image tiles (subsets of contiguous pixels of the synthetic image data 710). When the synthetic image data 710 is formed it may be quite misaligned with the image 102 due to inaccuracy in the geometric metadata associated with the image 102. A registration search uncertainty can be set large enough to ensure that the synthetic image data 710 can be registered with the image 102. The term coarse registration offset means a registration offset that grossly aligns the synthetic image data 710 with the image 102. To make the registration efficient and robust an initial registration can determine the coarse registration offset and remove the same. The fine registration can then operate within a smaller uncertainty region. The coarse registration can employ a larger uncertainty search region to remove a misalignment error, or misregistration, between the synthetic image data 710 and the image 102. Fine registration can use a smaller image tile size (and image template size) and a smaller search region to identify a set of TPS 714. The TPS 714 can be converted to CPs at operation 716. The fine registration can be performed after correcting alignment or registration using the coarse registration.

In both registration steps, the same technique may be used to independently register each image tile. The fine registration can use a smaller tile size and a smaller search region. The operation 712 can include identifying pixels of the synthetic image data 710 corresponding to high contrast edge pixels. Identifying pixels of the synthetic image data 710 corresponding to high contrast edge pixels can include using a Sobel, Roberts, Prewitt, Laplacian, or other operator. The Sobel operator (sometimes called the Sobel-Feldman operator) is a discrete differentiation operator that computes an approximation of the gradient of an intensity image. The Sobel operator returns a gradient vector (or a norm thereof) that can be converted to a magnitude and a phase. The Roberts operator is a discrete differentiation operator that computes a sum of the squares of the differences between diagonally adjacent pixels. The Prewitt operator is similar to the Sobel operator. The operation 712 can include correlating phase and magnitude of the identified high contrast edge pixels, as a rigid group, with phase and magnitude of pixels of the image 102.

To ensure that not all the edge pixels in the tile are running in the same direction (have gradients with same phase), the operation 712 can include computing two thresholds on the gradient magnitude, one for pixels whose gradient phase is near a principal phase direction and one for pixels not in the principal phase direction. The threshold for edges not in the principal phase direction can be lower than the threshold for edges in the principal phase direction. Edge correlation of the operation 712 can include summing over all the high contrast edge pixels of the gradient magnitude of the image times the gradient phase match between the synthetic image data 710 and the image 102.

Edge pixels associated with voids in the synthetic image data 710 can be suppressed and not used in the correlation with the image 102. The image 102 has no voids so the gradients of all pixels of the image 102 can be used.

One aspect of the method 700 is how the TPS 714 from coarse or fine registration are used to determine an offset for each tile between the synthetic image data 710 and the image 102. A synthetic image edge pixel template can be correlated as a rigid group (without rotation or scaling, only translation) with a gradient magnitude and phase of the image 102. A registration score at each possible translation offset can be a sum over all template pixels of an image gradient times a phase match. While the method 700 is tolerant to blunders in the correlation of individual tiles, an offset from the coarse registration must be calculated correctly or there is a risk of not being able to perform fine registration. Since the fine registration can use a smaller search radius, an error in the offset may cause the correct correlation location to be outside the search radius of the fine registration, therefore causing fine registration to be unable to correlate correctly. The blunder metrics, offset checking, and further details of the operations 712, 716 are discussed elsewhere herein.

At operation 716, the TPS 714 are converted to CPS 718 using the targetable 3D point set 104 from which the synthetic image data 710 was produced. The CPS 718 are five-tuples (row of the image 102, column of the image 102, X, Y, and Z) if the image 102 is being registered to the targetable 3D point set 104 (via the synthetic image data 710). The CPS 718 can include an elevation corresponding to a top of a building. A CP 718 corresponds to a 3D point in a scene. The registration provides knowledge of the proper point in the targetable 3D point set 104 by identifying the point that corresponds to the location to which the pixel of the synthetic image data 710 is registered.

The TPS 714 can be associated with a corresponding closest point in the targetable 3D point set 104 to become CPS 718. The TPS 714 can be associated with an error covariance matrix that estimates the accuracy of the registered TP 714. An index of each projected 3D point from the targetable 3D point set 104 can be preserved when creating the synthetic image data 710 at operation 708. A nearest 3D point to the center of a tile associated with the TP 714 can be used as a coordinate for the CP 718. The error covariance can be derived from a shape of a registration score surface at a peak, one or more blunder metrics, or a combination thereof.

At operation 720, the geometry of the image 102 can be adjusted (e.g., via a least squares bundle adjustment, or the like) to bring the image 102 into geometric alignment with the synthetic image data 710. The geometric bundle adjustment can include a nonlinear, least squares adjustment to reduce (e.g., minimize) mis-alignment between the CPs 718 of the image 102 and the synthetic image data 710.

This adjusted geometry could be used for the synthetic image data 710 as well, except the synthetic image data 710 may be of poorer resolution than the image 102 and may not be at the same absolute starting row and column as the image 102. The adjusted geometry of the image 102 can be used to create a projection for the synthetic image data 710 that is consistent with the absolute offset and scale of the synthetic image data 710.

After the operation 720 converges, the geometry of the image 102 can be updated to match the registered control. As long as the errors of the TPS 714 are uncorrelated, the adjusted geometry is more accurate than the TPS 714 themselves. A registration technique using CPS (e.g., a known XYZ location and an associated image coordinate from image 102) can be used to perform operation 720. From the CPS 718, the imaging geometry of the image 102 can be updated to match the geometry of the CPS 718.

Adjusting the geometry of the image 102 (the operation 720) is now summarized. Image metadata can include an estimate of the sensor location and orientation at the time the image was collected, along with camera parameters, such as focal length. If the metadata was perfectly consistent with the targetable 3D point set 104, then every 3D point would project exactly to the correct spot in the image 102. For example, the base of a flag pole in the targetable 3D point set 104 would project exactly to where one sees the base of the flag pole in the image 102. But, in reality, there are inaccuracies in the metadata of the image 102. If the estimate of the camera position is off a little, or if the estimated camera orientation is not quite right, then the 3D point representing the base of the flag pole will not project exactly to the pixel of the base in the image 102. But with the adjusted geometry, the base of the flag pole will project very closely to where the base is in the image 102. The result of the registration is adjusted geometry for the image 102. Any registration process can be used that results in an adjusted geometry for the image 102 being consistent with the targetable 3D point set 104.

Figure 8:
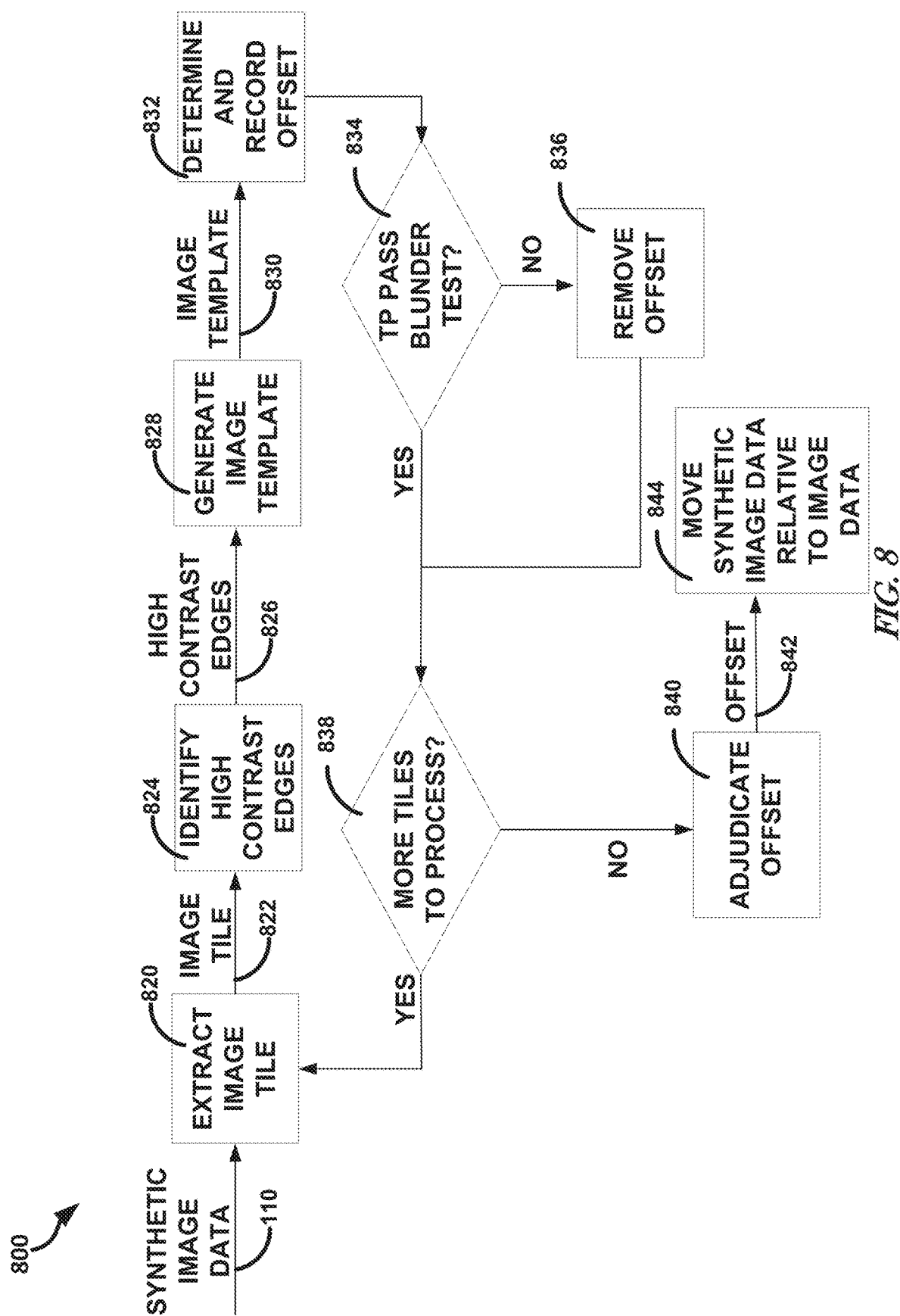
FIG. 8 illustrates, by way of example, a diagram of an embodiment of a method for registering the synthetic image data to the image.

FIG. 8 illustrates, by way of example, a diagram of an embodiment of a method 800 for registering the synthetic image data 710 to the image 102. At operation 820, an image tile 822 is extracted from the synthetic image data 710. The image tile 822 is a proper contiguous subset (less than the whole) of the synthetic image data 710 that is a specified number of rows of pixels by a specified number of columns of pixels. The number of rows and columns can be a same or different number.

At operation 824, high contrast edges 826 of the image tile 822 are identified. The operation 824 can include using a gradient magnitude histogram and a phase histogram. A desired percentage set to a first threshold (e.g., 9%, 10%, 11%, 12%, 15%, a larger or smaller percentage, or some other percentage therebetween) for template sizes less than a specified size (e.g., 16,384 pixels (e.g., 128×128 pixels, or other number of pixels) and smaller) and a second, smaller threshold for larger templates sizes (e.g., 4%, 5%, 6%, a larger or smaller percentage, or some other percentage therebetween). It can be beneficial to use high contrast edge pixels whose edge directions (phases) are not all similar to each other. If the high contrast edges pixels had the same phase, there would be reliable registrability in the direction perpendicular to the edge direction, but not along the edge. So, the first step in determining which edge pixels to use in the template can include histogramming the gradient phase over all the pixels in the template image (e.g., using the gradient magnitude as the weight for each pixel when adding it to the histogram bin). Using a two-pane window each a specified number of degrees (e.g., 5, 10, 15, or other number of degrees) wide and 180 degrees apart, a sum over the histogram can be performed to find the highest window sum. The center of the pane with the highest sum can be set to be the principal phase direction. The pixels can be split into two sets, those whose phases are within +/−45 degrees (modulo 180) of the principal phase direction and those that are not. An interval larger or smaller than +/−45 degrees can be used. A different gradient magnitude threshold can be set for each set.

It can be desired to provide about half of the total high contrast edge pixels from each of the two sets. To do this for a particular set, the gradient magnitude over all the pixels in that set can be histogrammed. The gradient magnitude threshold can be identified at which a percentage of the total of high contrast edge pixels is realized. After the two thresholds are established, all the pixels from each set that are below the threshold are removed from the template. There are at least two reasons that edge based registration provides better results than FFT or NCC. First, the synthetic image data 710 usually has a significant number of voids due to voids in the targetable 3D point set 104. These voids are not handled effectively by FFT and NCC correlation, even when a hole-filling algorithm is performed. The second reason is the ability to register to multiple sensor types using edge-based TP identification. The sensor types can include daytime panchromatic and MSI, IR, SAR, nighttime EO, or the like. The FFT and NCC correlation methods are not effective when the synthetic image intensities are from a different sensor modality than that of the image being registered. In contrast, an edge-based correlation method is effective across sensor modalities.

At operation 828, an image template 830 can be generated. The image template 830 is the same size as the image tile and includes only those pixels corresponding to the identified high contrast edges at operation 824.

At operation 832, an offset between an initial location estimate of the image template 830 in the image 102 and a location indicated by a phase and magnitude of edges in the image 102 can be determined. The initial location estimate can be determined based on the projection of the targetable 3D point set 104 to the image 102 in the generation of the synthetic image data 710. The X and Y of the targetable 3D point set 104 can be adjusted based on the geometry of the image 102 to generate the location estimate.

For each pixel in the image template 830 there are at least three values: 1) its row value in the template; 2) its column value in the template; and 3) its gradient phase. As previously discussed, there is an initial estimate of where this template is in relation to the image 102 to which the image 102 is being registered. The search range is of delta row offsets and delta column offsets that the image template 830 is rigidly moved around in and compared to the gradient magnitude and phase of the image 102. At each offset, the template pixels will fall on a particular set of pixels in the registration image 102.

To compute the metric for measuring how good the correlation is at that the current offset, a computation, for each pixel in the template, of the gradient magnitude at the pixel in the image 102 corresponding to the current offset times the phase match between the gradient phase of the template pixel and the gradient phase of the image pixel. The phase match can be 90 minus the absolute difference in the two phase directions. For example, if the template phase at the pixel is 37 and the phase at the corresponding pixel in the image is 30, the absolute phase difference would be 7 and the phase match value would be 90−7=83. For cross sensor applications, the gradient can be pointing in the exact 180 degree opposite direction to the edge in the synthetic image data 710. This can be accounted for. For example, if the image 102 had a phase of 217, the absolute difference would be 187. Since the difference is greater than 90 we subtract off 180 to still get a difference of 7. The phase difference factor in the registration can be 90 minus the difference or another function of the difference. This process allows edges running in the same direction but with opposite phase to have a large phase match value. The phase match can be used to lower the weight of the contribution (in the sum) of pixels whose edge directions are very different from the template pixels. The score at each offset can be the sum over all the pixels of the template at that offset of the gradient magnitude times the phase match. The offset with the highest score can be taken to be the correct registration offset.

At operation 834, it can be determined whether a TP of the image tile 822 passes a blunder test. Several metrics (blunder metrics) may be used to assess the quality of the TPS 714 and to identify blunders (sources of error). A blunder metric (whose thresholds can be sensor dependent) can include a) a registration score, b) peak sharpness as the ratio of the score at the second highest peak to the highest score, c) an average gradient magnitude over all the edge pixels at the registered location, d) an average gradient phase match over all the template edge pixels at the registered location, e) a difference between a tile's registration offset and a median offset computed based on all TPS 714, or f) an average (e.g., a weighted average) gradient phase match. The weighted average, gradient magnitudes can be used as the weights. Another metric that may be used is the difference between a registration offset of the image tile 822 and a median offset computed from all TPS 714.

If the identified candidate TP passes the blunder test at operation 834, the TP can be added to a set of trusted TPS. If the TP does not pass the blunder test, the offset can be discarded at operation 836. This means that the image tile 822/image template 830 is not used in registering the synthetic image data 710 to the image 102. At operation 838, it can be determined if there are more tiles to process. The operation 820 can then be performed to get a next image tile 822 if there are more tiles to process. Otherwise, operation 840 can be performed.

The operation 840 can adjudicate between estimates of the correct offset. Note that for each trusted image tile, an offset is estimated, so the operation 840 can attempt to determine which offset is the most correct. A least squares affine transformation can be computed from all trusted TPS. A trusted TP is one that passes the blunder metrics at operation 834. Note that a least squares calculation is sensitive to blunders. If blunders have slipped through, an affine transformation between CPs 718 can be negatively impacted. An estimate of an offset can be computed using a median (e.g., weighted median) of the individual offsets from the trusted tiles. The weight for each TP 714 can be a function of one or more blunder metrics above. Finally, a third estimate of the gross offset may be computed by combining the registration scores of all the trusted tiles at each offset into one unified total score. The offset with the maximum unified score can be another gross offset estimate. A determination of which offset is correct can be performed only in coarse registration and not in fine registration. For fine registration, each tile is registered independently and gets its own offset. All tiles that pass the blunder thresholds can be converted to CPS and used in the geometric bundle adjustment.

An adjudication to determine the correct offset, at operation 840 can include determining a median TP offset, an affine transformation computed based on the trusted TPs, and an offset associated with a top peak from a combined score surface of all TPs. To determine the trustworthiness of the offset, the maximum offset from the peak whose score is at least a specified percentage (e.g., 70%, 75%, 80%, 85%, 90%0, 95%, 99%, a greater or lesser percentage, or some percentage therebetween) of a maximum correlation score may be computed. If the maximum offset is more than a specified threshold of a search radius (e.g., 25%, 50%, 75%, 80%, 85%, 90%, 95%, or a greater or lesser percentage), then the maximum combined score offset can be considered untrustworthy and discarded. If the distance is less than, or equal to, the specified threshold, the offset can be considered to pass the test and be used to determine a final offset value. If the determined offset passes the test, a median TP offset may be determined. If the median TP offset value is at least a specified percentage (e.g., 70%, 75%, 80%, 85%, 90%, 95%, 99%, a greater or lesser percentage, or some percentage therebetween) of the maximum score, then the median offset can replace the combined score offset. The offset computed from an affine transformation at the center of the image can be compared against the chosen offset. If the affine transformation produces a smaller shift, then the affine transformation offset can be selected as a correct offset 842. At operation 844, the synthetic image data 710 can be moved relative to the image 102 by the gross offset 842 prior to performing fine registration.

In some embodiments, the operation 840 can include determining whether an offset is trustworthy. The operation 840 can include determining whether the offset is less than a threshold offset. If not, the offset can be discarded. If so, the offset can be further adjudicated. An estimate of a gross offset can be computed using a median (e.g., weighted median) of the individual offsets from the trusted tiles.

To determine the trustworthiness of the gross offset of the combined registration score surface, the maximum offset distance from the peak whose score is at least 90% of a maximum correlation score may be computed. If the distance is more than a specified threshold of the search radius (e.g., 25%, 50%, 75%, 80%, 85%, 90%, 95%, or a greater or lesser percentage), then the maximum combined score offset can be considered untrustworthy. If the distance is less than, or equal to, the specified threshold, the offset can be considered to pass the test. If the distance passes the test, a median TP offset may be used. If this value is at least 95% of the maximum score, then the median offset replaces the combined score offset. The offset computed from an affine transformation at the center of the image can be compared against the chosen offset. If the affine transformation produces a smaller offset, then the affine transformation offset can be selected.

An affine transformation between the image 102 and the synthetic image data 710 can be identified or determined, such as based on the TPS 714. The affine transformation can be determined using a least squares fit to the TPS 714 between the image 102 and the synthetic image data 710. The result of the affine transformation indicates the pixel in the other image corresponding to a given pixel in a source image.

An affine transformation is a linear mapping that preserves points, straight lines, planes. That is, parallel lines in a source image remain parallel after an affine transformation to a destination image. Different affine transformations include translation, scale, shear, and rotation.

The method 800 can be performed one, two, or more times. In some embodiments, each consecutive performance of the method 800 can use a smaller image tile 822 (and corresponding search radius) that is smaller than in an immediately prior performance of the method 800.

As previously mentioned, after coarse registration results (a first pass of the method 800) are applied, a fine registration can be performed using a smaller search region. The same registration method 800 (including blunder metrics) can be applied. The TPS 714 that pass the blunder metrics can be converted to CPS 718 using the closest projected 3D point to the center of the tile. Each point in the targetable 3D point set 104 has an intensity associated with the point. When a point (via the geometry of the image 102 we are registering to) of the targetable 3D point set 104 is projected to a pixel in the synthetic image data 710, that point will, very likely, not project exactly to the center of a pixel. Whatever pixel of the synthetic image data 710 it projects to is associated with an intensity associated with the point. The synthetic image data 710 can retain a point identification of the point whose intensity was used to fill in the pixel. Because the targetable 3D point set 104 may be irregularly spaced and have voids not every pixel may get filled in. Each empty pixel of the synthetic image data 710 can be provided with an intensity derived from the neighbors that are filled. If the pixel has no nearby neighbors that are filled in (which can happen for large voids in the point set), that pixel can be left empty and not used in the registration. When registering an edge template to the image 102, a center of the template is a convenient location from which to get a CP, but the center pixel may have been a pixel that did not have a 3D point that projected to it. In such cases, a pixel closest to the center that did have a point projected to it can be used for the CP. The X, Y, and Z of that point can be used as a location of the CP. The image location of CP can be shifted to be commensurate with the pixel being used in the CP. The image location can be further moved (in a subpixel fashion) to account for where inside the pixel the point actually projected. For example, the 3D point may have projected to a point a seventh of a pixel row above the center of the pixel and a quarter of a pixel column to the right of the center of the pixel. The image location can be shifted with these subpixel row and column adjustments to correspond to actual projected point.

The error covariance may be derived from the shape of the registration score surface at the peak and the quality metrics. The registration scores in a neighborhood centered at a top scoring offset location can be used to calculate the error covariance. The following method can be used. This method is described using a radius of three (3), but other radius values can be used. A radius of three (3) results in a 7×7 region centered at the location of top scoring offset. For the 7×7 region centered at the top scoring offset a minimum score can be determined. This score is subtracted off each score in the 7×7. Three sums can be determined using the 7×7. A first sum (sum1) can the sum over all the offsets in the 7×7 of the score at that offset times the square of the column difference of that offset with the center of the 7×7. As second sum (sum2) can be the score at that offset times the square of the row difference of that offset with the center of the 7×7. A third sum (sum3) can be the score at that offset times the column difference of that offset with the center of the 7×7 times the row difference of that offset with the center of the 7×7. The three sums can be divided by the sum of the scores over the 7×7 region. Let scoreSum denote the sum of the scores over the 7×7 region. These values are computed in the space of the registration image, which may not have been performed at the full resolution of the image and may need to be scaled to full resolution. Let ratioCol be the ratio of the X scale of the registration image in the column direction to the scale of the image in the column direction. Let ratioRow be the analogous ratio in the Y direction. The covariance for the CP image location is stored as an upper triangular 2×2 matrix (i.e. three values) where covar[0]=the square of ratioCol×Sum1/scoreSum, covar[1]=ratioCol×ratioRow×Sum3/scoreSum, covar[2]=the square of rowRatio*Sum2/scoreSum.

If the application of the blunder thresholds retains too few CPs, the blunder thresholds can be iteratively relaxed until a sufficient number of CPs are retained. The threshold values used to reduce blunders can be sensor dependent. In an example, if the number of TPS 714 that pass the blunder rejection are below a minimum number of TPS 714, the metrics may be relaxed, such as to achieve a specified minimum number of TPS 714.

Figure 9:
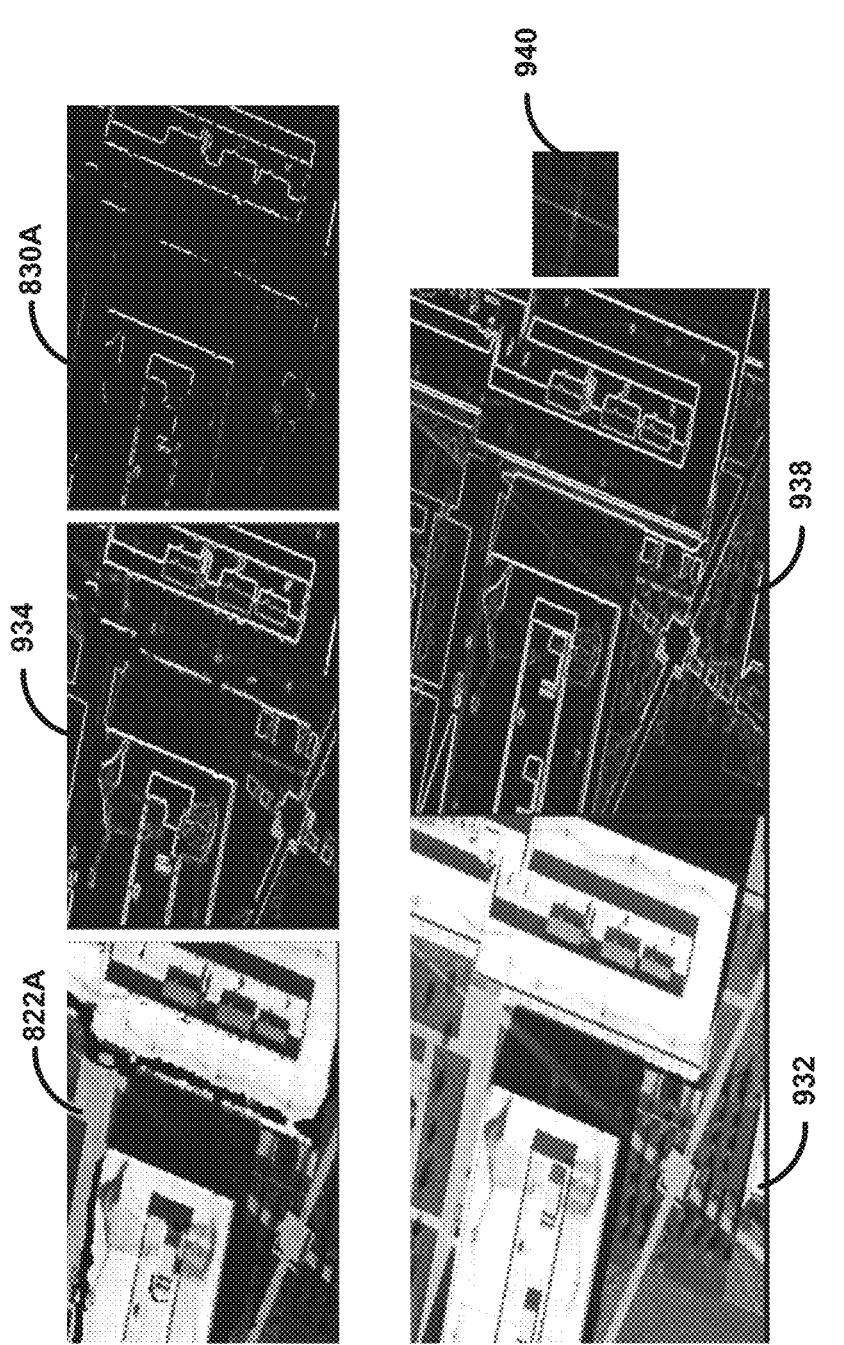
FIG. 9 illustrates, by way of example, grayscale image chips of an edge-based registration of an image tile.

FIG. 9 illustrates, by way of example, grayscale image chips of an edge-based registration of an image tile. The image chips include views of a point cloud and image of a portion of Richardson, Tex. The upper row of image chips shows the tile from a synthetic image tile 822A, a gradient magnitude from a Sobel operator in image chip 934, and high contrast edge pixels selected to use in the registration in image template 830A. The Sobel gradient operator can be used to generate gradient magnitude and phase for both the synthetic image tile 822A and an image tile 932. The image tile 932 includes a proper subset of the pixels of the image 102. The lower row of images in the figure shows the image tile 932 to which to register, its Sobel gradient magnitude in image chip 938, and a registration score resulting from correlating the high contrast synthetic image edges with the gradient from the image being registered at image chip 940. The image tile 932 is larger than the synthetic image tile 822A because it must accommodate the template size of the synthetic image tile 822A plus the registration search radius (to account for error). The correlation score (at each offset) indicates that the highest correlation of the high contrast edges occurs with the center point of the synthetic image tile 822A projected to a pixel below center and right of center in the image tile 932. The process of FIG. 8 can be repeated using a tile of a smaller size and a smaller search region to get an even better correlation of the high contrast edges.

Figure 10:
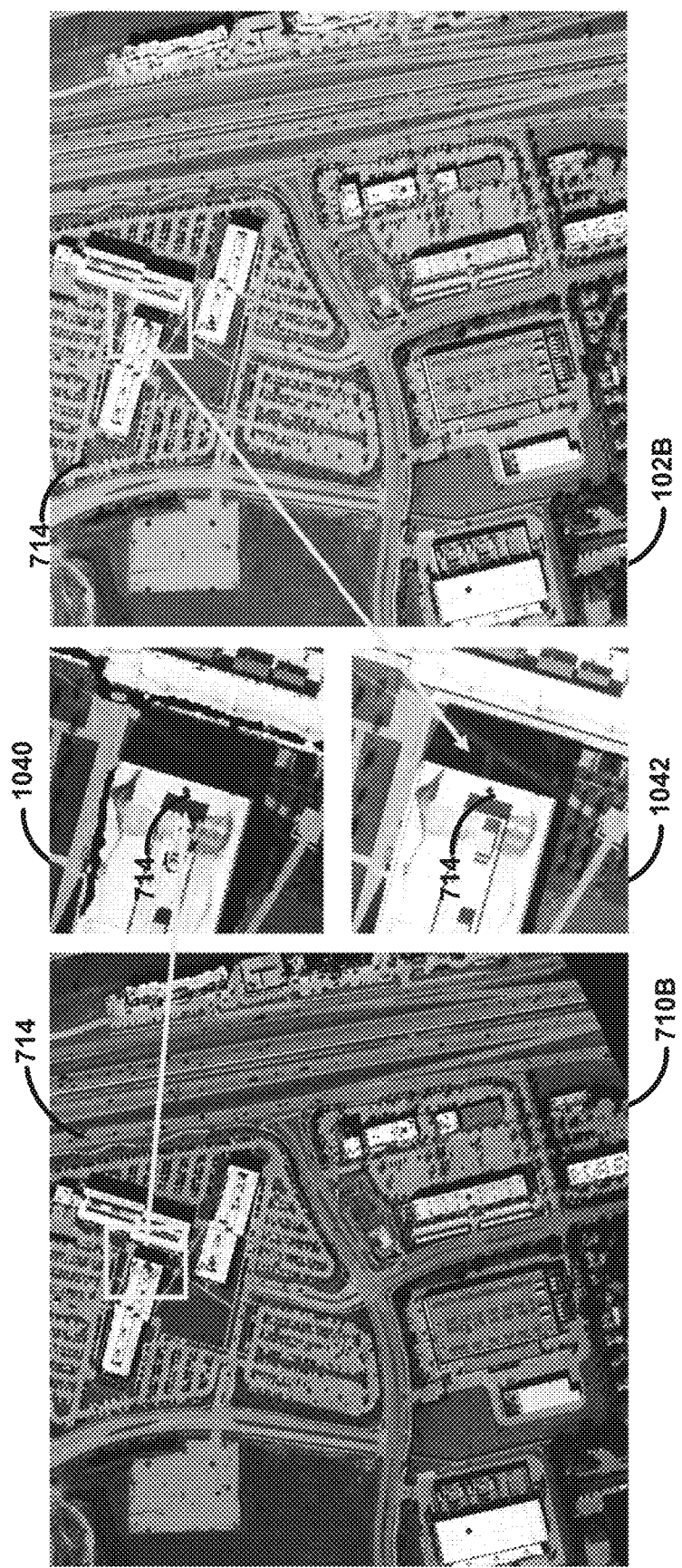
FIG. 10 illustrates, by way of example, tie points (TPS) between the image and a synthetic image data.

FIG. 10 illustrates, by way of example, TPS 714 between the image 102 and a synthetic image data 710. In FIG. 10, the TPS 714 identified between a synthetic image data 710B and an image 102B for an image of a portion of Richardson, Tex. are shown. FIG. 10 illustrates a first image tile 1040 from the synthetic image data 710B, a second image tile 1042 from the image 102B.

Nighttime images provide some unique challenges to image registration. To register a 3D point set and a 2D nighttime image, the direction of the registration can be reversed. Recall from a previous discussion that high contrast edges can be identified in a synthetic image data 710 and correlated with a gradient of the edges in the image 102. This registration direction handles voids in the targetable 3D point set 104 automatically. For nighttime images, the high contrast edges can be identified in the nighttime image and correlated with a gradient of the edges in the synthetic image data 710. This is helpful because many of the edges in the synthetic image data 710 may be from areas with no lighting in the nighttime image and therefore be non-existent or unreliable registration content. Unfortunately, when the direction of the registration is reversed, as it is in the registration of a nighttime image, voids in the synthetic image data 710 are not handled automatically.

In the nighttime case, the gradients of pixels on or next to voids in the synthetic image data 710 are not used. Thus, not all offsets in the registration search area will use the same number of pixels to determine a correlation score. To mitigate this inequity between offsets, the number of non-void pixels used in computing the score for each offset can be counted. Normalization may then be performed based on the count.

In some embodiments, tiles with no image content (e.g., are all black or do not have sufficient contrast) may be eliminated prior to correlation. For example, a tile in a portion of the image is all black and thus there is no contrast between pixel intensities and nothing to which to register. To identify images tiles with insufficient registrable content, statistics for an image tile can be computed on the pixel intensities and gradient magnitudes. If the intensity range or gradient percentiles are too small, the tile may not be used for registration. In an embodiment, minimum and maximum intensities along with the median and one percent intensity values (or other percent intensity values) can be calculated for each image tile. Further, $90^{th}$, $95^{th}$, and $99^{th}$ percentiles of the gradient magnitude may be calculated. The intensity values and the gradient magnitudes may be used to determine if a tile is eliminated or retained for registration.

The gradients for pixels associated with the light from a light fixture can be suppressed before template pixels (pixels used for registration) can be determined. Lights typically have edges that are further out than a corresponding light fixture. Thus, the edges associated with lights typically have no corresponding edges in the synthetic image data 710. However, edges associated with the illuminated ground and objects illuminated by the lights tend to be good for registration. In some nighttime images there are edges corresponding to objects illuminated by lights that can be used for registration since there will be corresponding edges in the synthetic image data 710.

To suppress the pixels corresponding to light from a light fixture, the minimum and maximum intensity in a neighborhood (e.g., a 2×2, 3×3, 4×4, or the like) of the pixel may be determined. If the maximum intensity exceeds a specified percentage value, which can be computed over the whole tile or the whole image, the pixel can be deemed to be associated with a light and a gradient magnitude of that pixel can be reduced accordingly. Or if the minimum intensity exceeds the one percent value, which may be computed over the whole tile, and the maximum intensity exceeds the median value, the pixel is deemed to be associated with a light and the gradient magnitude is reduced accordingly.

Figure 11:
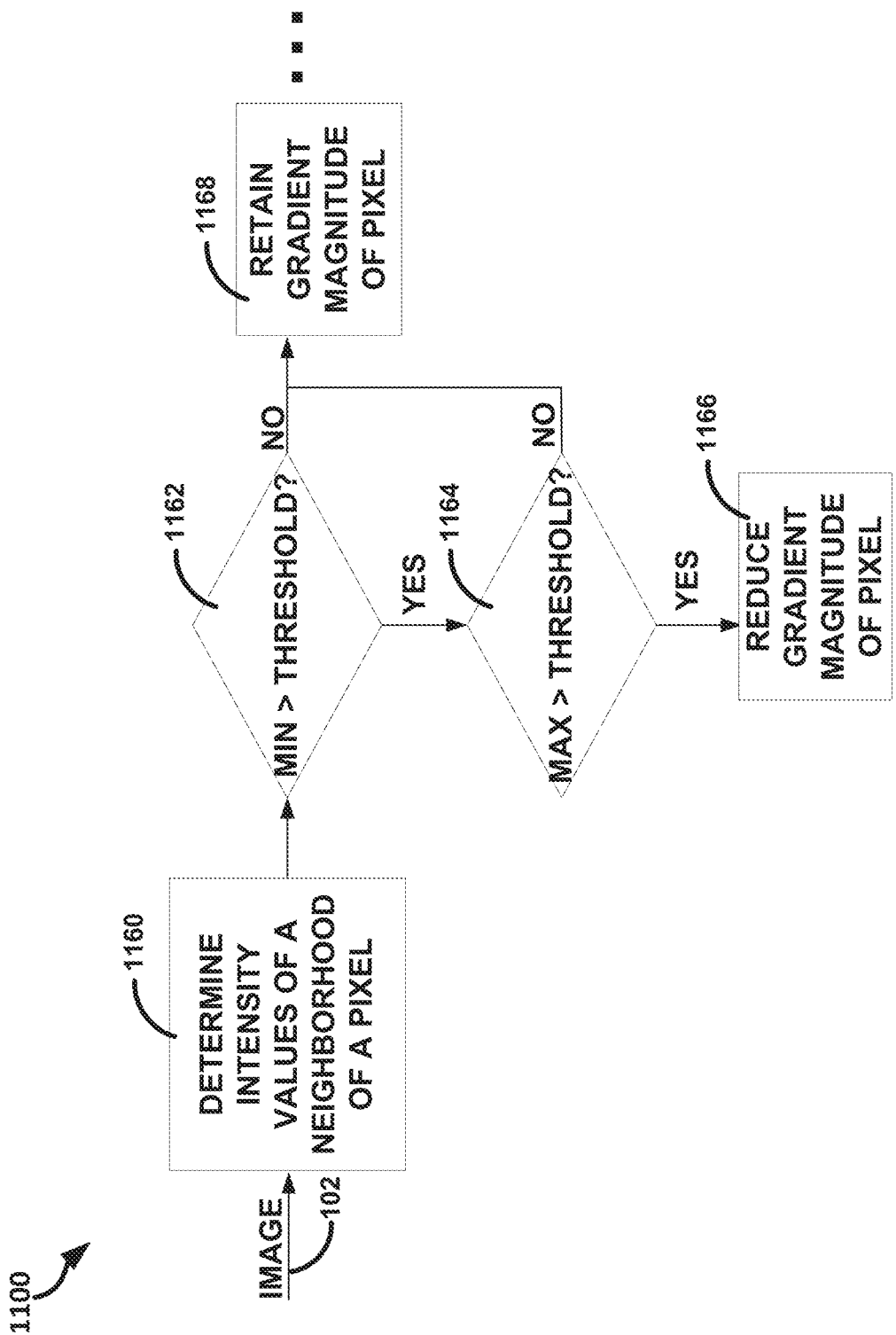
FIG. 11 illustrates, by way of example, a flow diagram of an embodiment of a method for registration of a nighttime image.

FIG. 11 illustrates, by way of example, a flow diagram of an embodiment of a method 1100 for registration of a nighttime image. The method 1100 can include operations same or similar to the operations of the method 700 or 800. At operation 712 (see FIG. 7), however, for nighttime images, and as previously discussed, the high contrast edges can be identified in the nighttime image and a gradient of the identified edges can be correlated with a gradient of the edges in the synthetic image data 710. Further, the method 700 can include operations to account for edges present in the nighttime image that are not present in the synthetic image data 710. Operations of FIG. 11 are configured to account for edges present in the nighttime image that are not present in the synthetic image data 710.

At operation 1160 a minimum (MIN) and maximum (MAX) intensity value in a neighborhood of a pixel (e.g., a 3×3, 5×5, or the like around the pixel with the pixel in the center of the neighborhood) can be determined. At operation 1162, it can be determined if the MIN is greater than a threshold value. The threshold value can be determined based on intensity values of an image tile that includes the pixel. In some embodiments, the threshold value can be a specified percentile (e.g., $1^{st}$, $2^{nd}$, $5^{th}$, $10^{th}$, $15^{th}$, $25^{th}$, a greater percentile, or some percentile therebetween) of the image intensity values of the image tile or image or a specified percentage of a maximum intensity value of the image tile or image (e.g., 1%, 2%, 5%, 10%, 15%, 25%, a greater percentage, or some percentage therebetween).

If the MIN is less than the threshold, it can be determined if the MAX is greater than a threshold value, at operation 1164. The threshold value can be a median, mode, average, a specified percentile (e.g., $40^{th}$, $50^{th}$, $75^{th}$, $90^{th}$, a greater percentile, or some percentile therebetween) of the image intensity values of the image tile or image or a specified percentage of a maximum intensity value of the image tile or image (e.g., 40%, 50%, 75%, 90%, a greater percentage, or some percentage therebetween). If the MAX is not greater than the threshold, a gradient magnitude of the pixel can be retained. If the MAX is greater than, or equal to, the threshold a magnitude of the gradient of the pixel can be reduced at operation 1166. The magnitude can be reduced such that it does not contribute meaningfully to determining the offset or parameter of the image geometry.

Previous solutions for registration of 2D images with 3D data can be used with the present subject matter. For example, U.S. Pat. Nos. 9,269,145 and 9,275,267 teach of registration of a 2D image to a 3D data set that lacks intensity values. Their registration techniques can be employed in conjunction with subject matter discussed herein.

Figure 12:
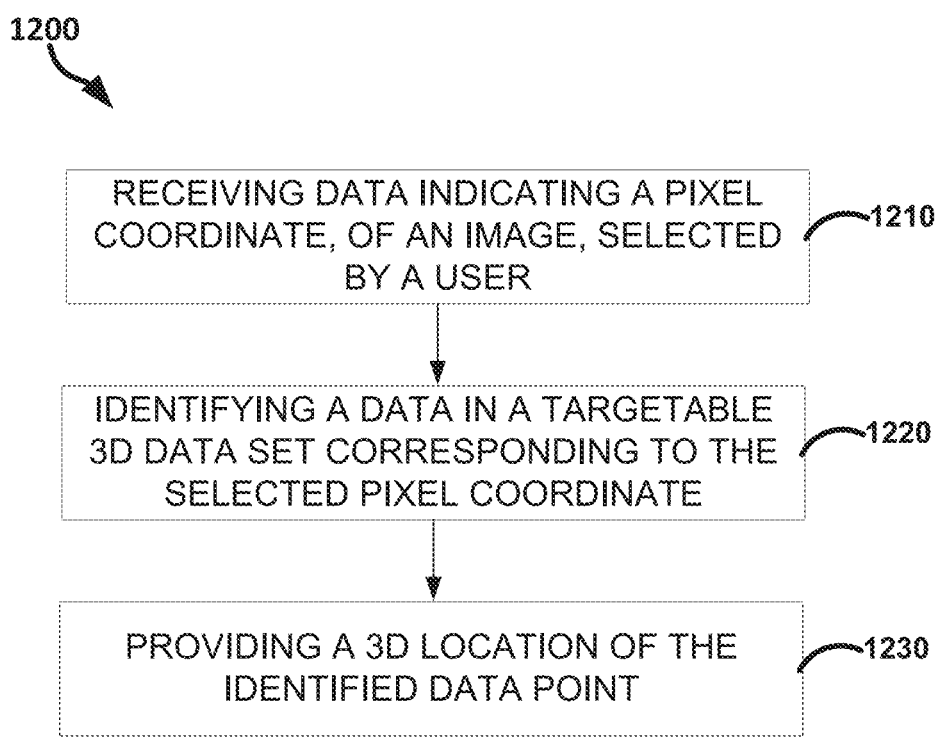
FIG. 12 illustrates, by way of example, a flow diagram of an embodiment of a method for providing geolocation of an image coordinate of an image.

FIG. 12 illustrates, by way of example, a diagram of an embodiment of a method 1200 for identifying a geolocation of an object in an image 102. The method 1200 as illustrated includes receiving data indicating a pixel coordinate 110 of the image 102 selected by a user, at operation 1210; identifying a data point in a targetable 3D point set 104 corresponding to the selected pixel coordinate 110, 1220, and providing a 3D location of the identified data point, at operation 1230.

The method 1200 can further include registering the image to the targetable 3D data set by adjusting a geometry of the image to generate a registered image. The operation 1220 can further include determining the data point in the 3D data set that corresponds to the pixel coordinate in the registered image. The operation 1220 can further include voxelizing the 3D data set and identifying 3D data points of the 3D data set indexed in voxels intersected by a ray representing a line of sight of an image sensor that generated the image. The operation 1220 can further include projecting the identified 3D data points to the image and determining a difference between an image coordinate to which the identified 3D data point projects and an image coordinate in the registered image of the selected pixel to determine a discrepancy for each identified 3D data point. The operation 1220 can further include providing the 3D location of the identified 3D data point with a discrepancy that is less than a threshold discrepancy value and physically closest to a geolocation at which the image sensor captured the image.

The operation 1230 can include providing the 3D location of the point. The operation 1230 can further include providing an error associated with the provided 3D location. The operation 1230 can further include determining an accumulated error of registering the 3D data set, the user selecting the pixel, transferring the selected pixel to the 3D data set, and registering the image to the 3D data set. The operation 1230 can further include, wherein the error of the user selecting the pixel is determined by converting an estimated pixel selection error to a distance on the surface of the registered 3D data set.

The method 1200 can further include, wherein the object is one of a fixed target or a mobile target, and wherein the selected pixel corresponds to the object in the image. The operation 1230 can further include providing the geolocation of the object within a threshold time period (e.g., 30 seconds, one minute, two minutes, three minutes, four minutes, five minutes, a greater or lesser time or some time therebetween) from receiving the data indicating the pixel coordinate.

Figure 14:
FIG. 14 illustrates, by way of example, a picture of an embodiment of the 3D data set (colored by intensity) at a geolocation overlapping with a geolocation depicted in the image.
Figure 13:
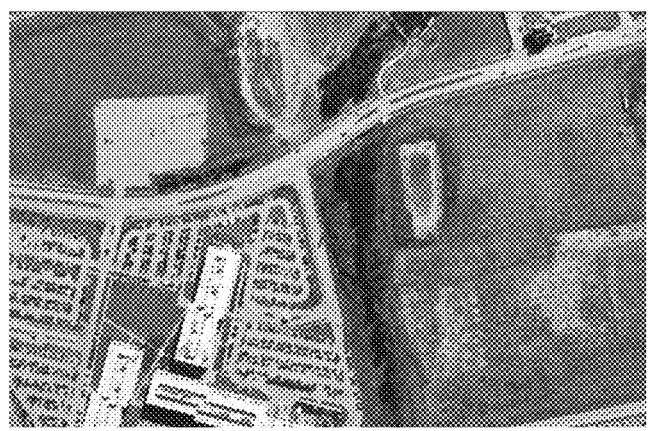
FIG. 13 illustrates, by way of example, a picture of an embodiment of an image.

FIG. 13 illustrates, by way of example, a picture of an embodiment of the image 102. FIG. 14 illustrates, by way of example, a picture of an embodiment of the targetable 3D point set 104 at a geolocation overlapping with a geolocation depicted in the image 102. The targetable 3D point set 104 is colored based on intensity to aid understanding.

Figure 15:
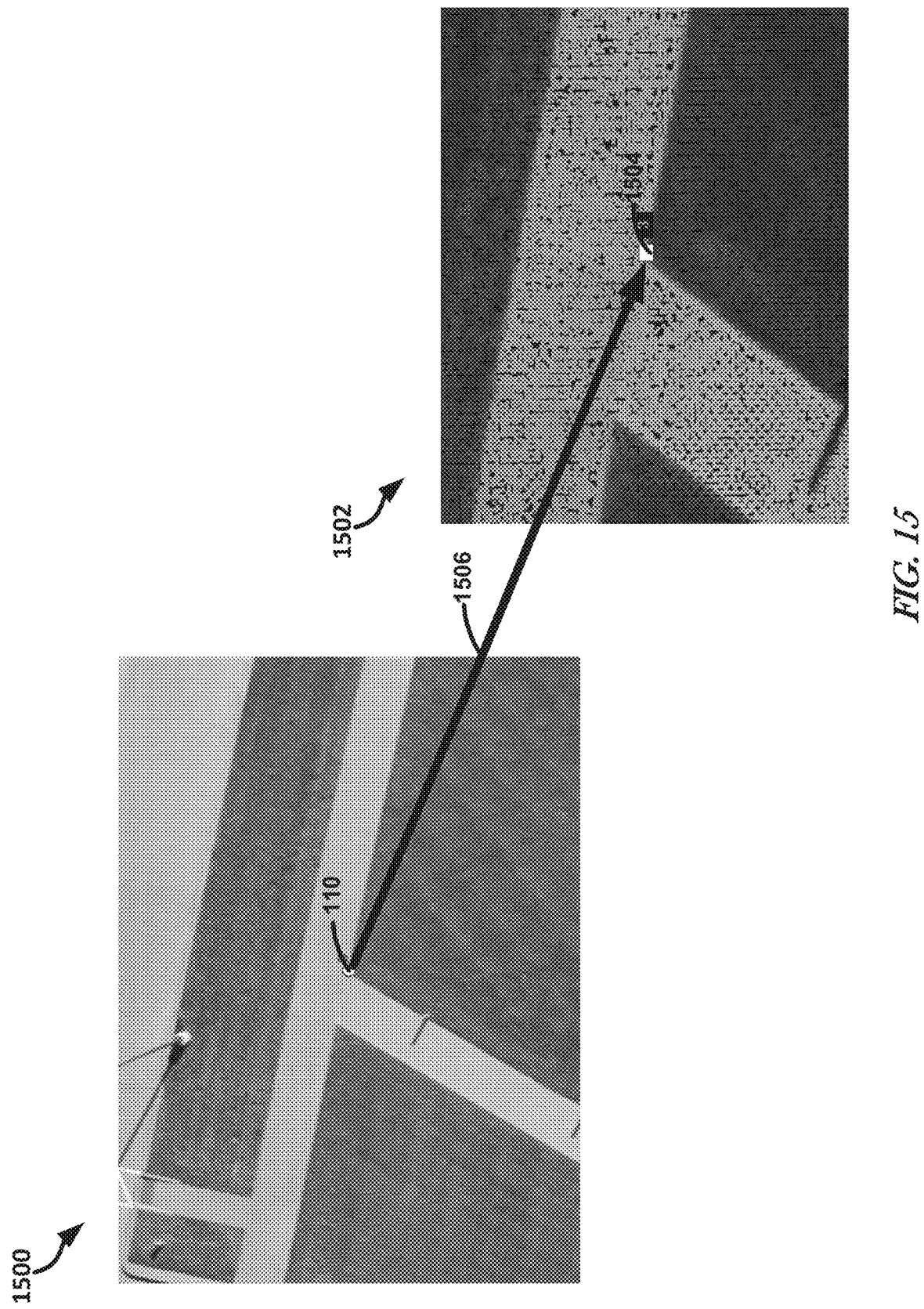
FIG. 15 illustrates, by way of example, an exploded view picture of a portion of the image and a corresponding exploded view picture of a portion of the targetable 3D data set.

FIG. 15 illustrates, by way of example, an exploded view picture 1500 of a portion of the image 102 and a corresponding exploded view picture 1502 of a portion of the targetable 3D point set 104. The user-selected image coordinate 110 is indicated by a circle on the picture 1500. A corresponding coordinate 1504 to which a ray intersection 1506 maps (based on performing methods discussed regarding FIGS. 2-5). The geolocation of the coordinate 1504 can be determined by looking up an index of a voxel in the targetable 3D point set 104. An error of the coordinate 1504 can be determined using methods discussed herein and provided, along with the geolocation, as the geolocation and error 114.

While embodiments herein are generally discussed with regard to a targeting application in 3D, the embodiments may be employed not only for military, but also for commercial, civil or industrial applications. For example, determining 3D coordinates as describe herein can provide an automatic replacement for manual geodetic surveying of ground control points for use in photogrammetric processes. The embodiments may be employed for accurate map making based on newly acquired imagery over an industrial or urban region.

Figure 16:
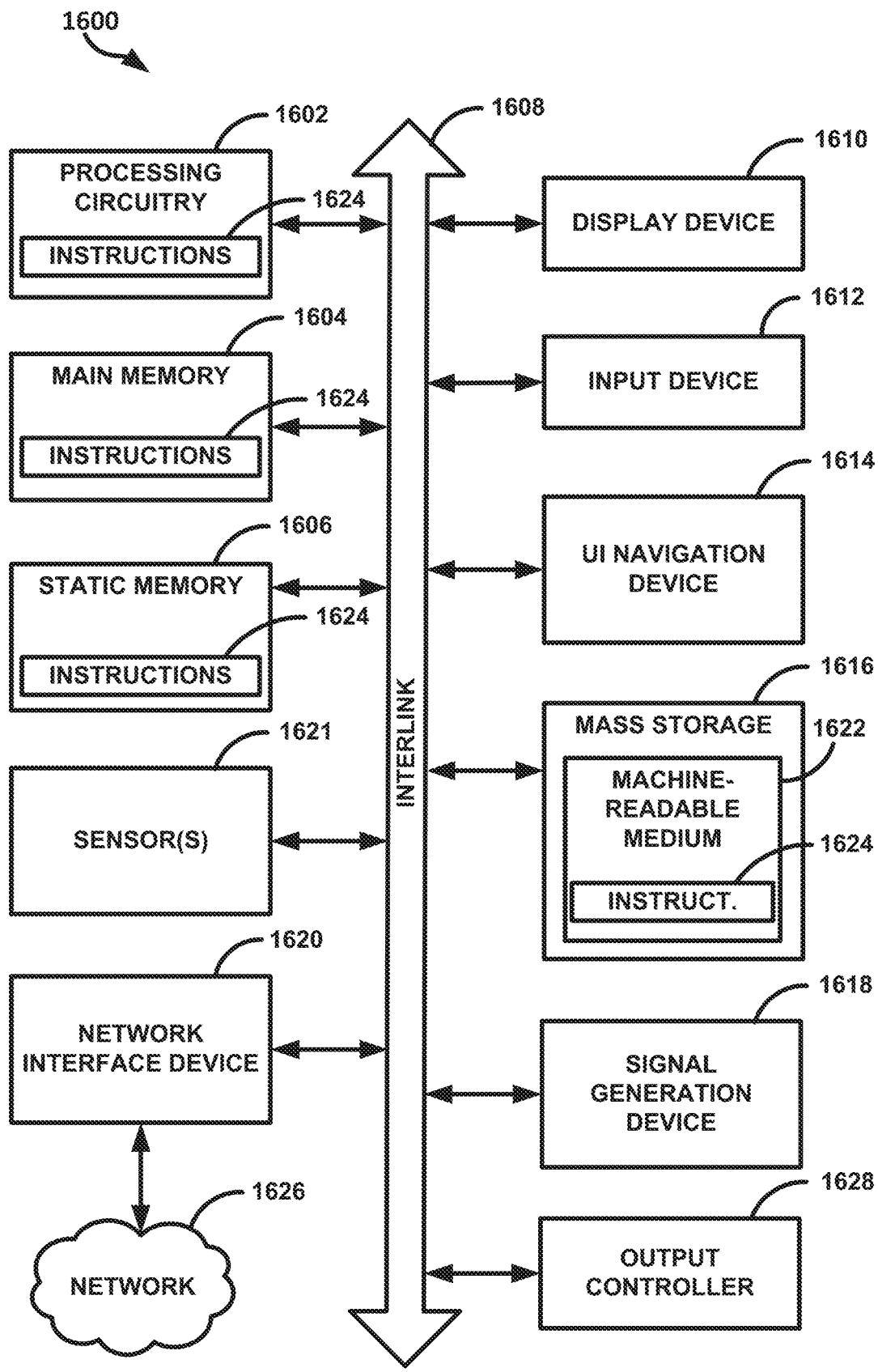
FIG. 16 illustrates, by way of example, a block diagram of an embodiment of a machine on which one or more of the methods discussed herein can be implemented.

FIG. 16 illustrates, by way of example, a block diagram of an embodiment of a machine 1600 on which one or more of the methods, such as those discussed about FIGS. 1-15 can be implemented. In one or more embodiments, one or more operations of the methods, systems, or devices of FIGS. 1-15 can be implemented by the machine 1600. In alternative embodiments, the machine 1600 operates as a standalone device or may be connected (e.g., networked) to other machines. In a networked deployment, the machine 1600 may operate in the capacity of a server or a client machine in server-client network environment, or as a peer machine in a peer-to-peer (or distributed) network environment. The machine 1600 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1600 includes processing circuitry 1602 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1621 (e.g., a transducer that converts one form of energy (e.g., light, heat, electrical, mechanical, or other energy) to another form of energy), or the like, or a combination thereof), a main memory 1604 and a static memory 1606, which communicate with each other and all other elements of machine 1600 via a bus 1608. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like.

The machine 1600 (e.g., computer system) may further include a video display unit 1610 (e.g., a liquid crystal display (LCD) or a cathode ray tube (CRT)). The machine 1600 also includes an alphanumeric input device 1612 (e.g., a keyboard), a user interface (UI) navigation device 1614 (e.g., a mouse), a disk drive or mass storage unit 1616, a signal generation device 1618 (e.g., a speaker) and a network interface device 1620. The display unit 1610 can provide a view of a user interface that can be navigated by a user using the UI navigation device 1614.

The mass storage unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processing circuitry 1602 during execution thereof by the machine 1600, the main memory 1604 and the processing circuitry 1602 also constituting machine-readable media. One or more of the main memory 1604, the mass storage unit 1616, or other memory device can store the job data, transmitter characteristics, or other data for executing the methods discussed herein.

The machine 1600 as illustrated includes an output controller 1628. The output controller 1628 manages data flow to/from the machine 1600. The output controller 1628 is sometimes called a device controller, with software that directly interacts with the output controller 1628 being called a device driver.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1624 may further be transmitted or received over a communications network 1626 using a transmission medium. The instructions 1624 may be transmitted using the network interface device 1620 and any one of several well-known transfer protocols (e.g., hypertext transfer protocol (HTTP), user datagram protocol (UDP), transmission control protocol (TCP)/internet protocol (IP)). The network 1626 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include a method for identifying a geolocation of an object in an image, the method comprising receiving data indicating a pixel coordinate of the image selected by a user, identifying a data point in a targetable three-dimensional (3D) data set corresponding to the selected pixel coordinate, and providing a 3D location of the identified data point.

In Example 2, Example 1 can further include registering the image to the targetable 3D data set by adjusting a geometry of the image to generate a registered image and wherein identifying the data point in the targetable 3D data set includes determining the data point in the 3D data set that corresponds to the pixel coordinate in the registered image.

In Example 3, Example 2 can further include, wherein identifying the data point in the targetable 3D data set further includes voxelizing the 3D data set and identifying 3D data points of the 3D data set indexed in voxels intersected by a ray representing a line of sight of an image sensor that generated the image.

In Example 4, Example 3 can further include, wherein identifying the data point in the targetable 3D data set includes further includes projecting the identified 3D data points to the image and determining a difference between an image coordinate to which the identified 3D data point projects and an image coordinate in the registered image of the selected pixel to determine a discrepancy for each identified 3D data point.

In Example 5, Example 4 can further include, wherein identifying the data point in the targetable 3D data set further includes providing the 3D location of the identified 3D data point with a discrepancy that is less than a threshold discrepancy value and physically closest to a geolocation at which the image sensor captured the image.

In Example 6, at least one of Examples 1-5 can further include, wherein providing the 3D location of the point further includes providing an error associated with the provided 3D location.

In Example 7, Example 6 can further include, wherein providing the error includes determining an accumulated error of registering the 3D data set, the user selecting the pixel, transferring the selected pixel to the 3D data set, and registering the image to the 3D data set.

In Example 8, Example 7 can further include, wherein the error of the user selecting the pixel is determined by converting an estimated pixel selection error to a distance on the surface of the registered 3D data set.

In Example 9, at least one of Examples 1-8 can further include, wherein the object is one of a fixed target or a mobile target, and wherein the selected pixel corresponds to the object in the registered image.

In Example 10, at least one of Examples 1-9 can further include, wherein providing the 3D location of the identified point includes providing the geolocation of the object within a threshold time period from receiving the data indicating the pixel coordinate.

Example 11 includes a system comprising a memory including a targetable three-dimensional (3D) data set, a user interface to provide a view of an image and receive data indicating a pixel coordinate of the image selected by a user, processing circuitry configured to identify a data point in a targetable three-dimensional (3D) data set corresponding to the selected pixel coordinate, and provide a 3D location of the identified data point.

In Example 12, Example 11 can further include, wherein the processing circuitry is further configured to register the image to the targetable 3D data set by adjusting a geometry of the image to generate a registered image and wherein identifying the data point in the targetable 3D data set includes determining the data point in the 3D data set that corresponds to the pixel coordinate in the registered image.

In Example 13, Example 12 can further include, wherein the processing circuitry is further configured to identify the data point in the targetable 3D data set further includes voxelizing the 3D data set and identifying 3D data points of the 3D data set indexed in voxels intersected by a ray representing a line of sight of an image sensor that generated the image.

In Example 14, Example 13 can further include, wherein the processing circuitry is further configured to identify the data point in the targetable 3D data set includes further includes projecting the identified 3D data points to the image and determining a difference between an image coordinate to which the identified 3D data point projects and an image coordinate in the registered image of the selected pixel to determine a discrepancy for each identified 3D data point.

In Example 15, Example 14 can further include, wherein the processing circuitry is further configured to identify the data point in the targetable 3D data set includes further includes providing the 3D location of the identified 3D data point with a discrepancy that is less than a threshold discrepancy value and physically closest to a geolocation at which the image sensor captured the image.

Example 16 includes at least one non-transitory machine-readable medium including instructions that, when executed by a machine, cause the machine to perform operations for identifying a geolocation of an object in an image, the operations comprising receiving data indicating a pixel coordinate of the image selected by a user, identifying a data point in a targetable three-dimensional (3D) data set corresponding to the selected pixel coordinate, and providing a 3D location of the identified data point.

In Example 17, Example 16 can further include, wherein providing the 3D location of the point further includes providing an error associated with the provided 3D location.

In Example 18, Example 17 can further include, wherein providing the error includes determining an accumulated error of registering the 3D data set, the user selecting the pixel, transferring the selected pixel to the 3D data set, and registering the image to the 3D data set.

In Example 19, Example 18 can further include, wherein the error of the user selecting the pixel is determined by converting an estimated pixel selection error to a distance on the surface of the registered 3D data set.

In Example 20, at least one of Examples 16-19 can further include, wherein the object is one of a fixed target or a mobile target, and wherein the selected pixel corresponds to the object in the registered image.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for identifying a geolocation of an object in an image, the method comprising:
   receiving data indicating a pixel coordinate of the image selected by a user;
   registering the image to the targetable 3D data set by adjusting a geometry of the image to generate a registered image;
   identifying a data point in a targetable three-dimensional (3D) data set corresponding to the selected pixel coordinate including:
   determining the data point in the 3D data set that corresponds to the pixel coordinate in the registered image;
   voxelizing the 3D data set; and
   identifying 3D data points of the 3D data set indexed in voxels intersected by a ray representing a line of sight of an image sensor that generated the image; and
   providing a 3D location of the identified data point.

2. The method of claim 1, wherein identifying the data point in the targetable 3D data set further includes projecting the identified 3D data points to the image and determining a difference between an image coordinate to which the identified 3D data point projects and an image coordinate in the registered image of the selected pixel to determine a discrepancy for each identified 3D data point.

3. The method of claim 2, wherein identifying the data point in the targetable 3D data set further includes providing the 3D location of the identified 3D data point with a discrepancy that is less than a threshold discrepancy value and physically closest to a geolocation at which the image sensor captured the image.

4. The method of claim 1, wherein providing the 3D location of the point further includes providing an error associated with the provided 3D location.

5. The method of claim 4, wherein providing the error includes determining an accumulated error of registering the 3D data set, the user selecting the pixel, transferring the selected pixel to the 3D data set, and registering the image to the 3D data set.

6. The method of claim 5, wherein the error of the user selecting the pixel is determined by converting an estimated pixel selection error to a distance on the surface of the registered 3D data set.

7. The method of claim 1, wherein the object is one of a fixed target or a mobile target, and wherein the selected pixel corresponds to the object in the registered image.

8. The method of claim 1, wherein providing the 3D location of the identified point includes providing the geolocation of the object within a threshold time period from receiving the data indicating the pixel coordinate.

9. A system comprising:
   a memory including a targetable three-dimensional (3D) data set;
   a user interface to provide a view of an image and receive data indicating a pixel coordinate of the image selected by a user;
   processing circuitry configured to:
   register the image to the targetable 3D data set by adjusting a geometry of the image to generate a registered image;
   identify a data point in a targetable three-dimensional (3D) data set corresponding to the selected pixel coordinate including:
   determining the data point in the 3D data set that corresponds to the pixel coordinate in the registered image;
   voxelizing the 3D data set; and
   identifying 3D data points of the 3D data set indexed in voxels intersected by a ray representing a line of sight of an image sensor that generated the image; and
   provide a 3D location of the identified data point.

10. The system of claim 9, wherein the processing circuitry is further configured to identify the data point in the targetable 3D data set further includes projecting the identified 3D data points to the image and determining a difference between an image coordinate to which the identified 3D data point projects and an image coordinate in the registered image of the selected pixel to determine a discrepancy for each identified 3D data point.

11. The system of claim 10, wherein the processing circuitry is further configured to identify the data point in the targetable 3D data set further includes providing the 3D location of the identified 3D data point with a discrepancy that is less than a threshold discrepancy value and physically closest to a geolocation at which the image sensor captured the image.

12. At least one non-transitory machine-readable medium including instructions that, when executed by a machine, cause the machine to perform operations for identifying a geolocation of an object in an image, the operations comprising:
   receiving data indicating a pixel coordinate of the image selected by a user;
   registering the image to the targetable 3D data set by adjusting a geometry of the image to generate a registered image including;
   identifying a data point in a targetable three-dimensional (3D) data set corresponding to the selected pixel coordinate:
   determining the data point in the 3D data set that corresponds to the pixel coordinate in the registered image;
   voxelizing the 3D data set; and
   identifying 3D data points of the 3D data set indexed in voxels intersected by a ray representing a line of sight of an image sensor that generated the image; and
   providing a 3D location of the identified data point;

identify a data point in a targetable three-dimensional (3D) data set corresponding to the selected pixel coordinate including:
  determining the data point in the 3D data set that corresponds to the pixel coordinate in the registered image;
  voxelizing the 3D data set; and
identifying 3D data points of the 3D data set indexed in voxels intersected by a ray representing a line of sight of an image sensor that generated the image.

13. The at least one non-transitory machine-readable medium of claim 12, wherein providing the 3D location of the point further includes providing an error associated with the provided 3D location.

14. The at least one non-transitory machine-readable medium of claim 13, wherein providing the error includes determining an accumulated error of registering the 3D data set, the user selecting the pixel, transferring the selected pixel to the 3D data set, and registering the image to the 3D data set.

15. The at least one non-transitory machine-readable medium of claim 14, wherein the error of the user selecting the pixel is determined by converting an estimated pixel selection error to a distance on the surface of the registered 3D data set.

16. The at least one non-transitory machine-readable medium of claim 12, wherein the object is one of a fixed target or a mobile target, and wherein the selected pixel corresponds to the object in the registered image.

\* \* \* \* \*